(12) United States Patent
Reichelderfer et al.

(10) Patent No.: US 12,465,173 B2
(45) Date of Patent: Nov. 11, 2025

(54) AUTOMATED COOKING SYSTEM WITH LIFT PLATFORMS

(71) Applicant: Henny Penny Corporation, Eaton, OH (US)

(72) Inventors: Kimberly Reichelderfer, Yellow Springs, OH (US); Thomas M. Smith, Lewisburg, OH (US); Adrian Jason Pereira, Dayton, OH (US); Michael Maddux, Kettering, OH (US)

(73) Assignee: Henny Penny Corporation, Eaton, OH (US)

( * ) Notice: Subject to any disclaimer, the term of this patent is extended or adjusted under 35 U.S.C. 154(b) by 836 days.

(21) Appl. No.: 17/686,816

(22) Filed: Mar. 4, 2022

(65) Prior Publication Data

US 2022/0346597 A1 Nov. 3, 2022

Related U.S. Application Data

(63) Continuation-in-part of application No. 17/344,063, filed on Jun. 10, 2021, now Pat. No. 12,262,847, (Continued)

(51) Int. Cl.
*A47J 37/12* (2006.01)

(52) U.S. Cl.
CPC ....... *A47J 37/1219* (2013.01); *A47J 37/1266* (2013.01); *A47J 37/129* (2013.01)

(58) Field of Classification Search
CPC ............... A47J 37/1228; A47J 37/1219; A47J 37/1266; A47J 37/1295; A47J 37/1276; A47J 37/1271; A47J 537/12

(Continued)

(56) References Cited

U.S. PATENT DOCUMENTS

| 3,164,406 A | 1/1965 | Barry |
| 4,722,267 A | 2/1988 | Galockin et al. |

(Continued)

FOREIGN PATENT DOCUMENTS

| JP | 63288117 A2 * | 11/1988 |
| JP | S63288117 A | 11/1988 |

(Continued)

OTHER PUBLICATIONS

International Searching Authority, Search Report and Written Opinion issued in International Patent Application No. PCT/US2018/063272 mailed Feb. 5, 2019 (16 pages).

(Continued)

*Primary Examiner* — Phuong T Nguyen
(74) *Attorney, Agent, or Firm* — Wood Herron & Evans LLP

(57) ABSTRACT

An automated cooking system for adding time and labor efficiencies has a fryer including a plurality of fryer vats, heating elements, and a vertical transport assembly associated with each of the fryer vats. The vertical transport assembly is configured to support and move a basket of food product into and out of the cooking medium at the fryer vat, and optionally also with reciprocating shaking movements as well. The vertical transport assembly includes a lift base, a platform support hanger, and a basket support platform. The basket support platform includes a tray-shaped platform portion defined by a wire rack construction that circumferentially surrounds a bottom portion of the basket to retain the basket, the platform portion having an angled entry taper to correct any misalignments of the basket and the basket support platform as a gantry moves the basket onto the basket support platform.

17 Claims, 19 Drawing Sheets

Related U.S. Application Data which is a continuation-in-part of application No. 17/244,096, filed on Apr. 29, 2021, now Pat. No. 11,678,769.

(58) Field of Classification Search
USPC ............... 219/430, 432; 426/302, 438, 523; 99/331, 403, 404, 409, 427, 419
See application file for complete search history.

(56) References Cited

U.S. PATENT DOCUMENTS

| | | | |
|---|---|---|---|
| 4,901,633 | A | 2/1990 | De Longhi |
| 4,913,038 | A | 4/1990 | Burkett et al. |
| 4,951,558 | A | 8/1990 | Figliuzzi |
| 5,112,633 | A | 5/1992 | Benson et al. |
| 5,142,968 | A | 9/1992 | Caron et al. |
| 5,172,328 | A | 12/1992 | Cahlander et al. |
| 5,191,918 | A | 3/1993 | Cahlander et al. |
| 5,224,415 | A | 7/1993 | McFadden et al. |
| 5,230,279 | A | 7/1993 | McFadden et al. |
| 5,232,151 | A | 8/1993 | Mercer et al. |
| 5,263,406 | A | 11/1993 | Chiu |
| 5,973,297 | A | 10/1999 | Winter et al. |
| 6,165,525 | A | 12/2000 | Rolle et al. |
| 6,427,583 | B1 | 8/2002 | Shimansky et al. |
| 6,588,325 | B1 | 7/2003 | Savage |
| 6,869,633 | B2 | 3/2005 | Sus et al. |
| 7,100,497 | B2 | 9/2006 | Shandross |
| 7,343,719 | B2 | 3/2008 | Sus et al. |
| 7,441,388 | B2 | 10/2008 | Sus et al. |
| 7,775,156 | B2 | 8/2010 | Sus et al. |
| 8,034,390 | B2 | 10/2011 | Sus et al. |
| 8,037,812 | B1 | 10/2011 | Sumner, Sr. |
| 8,065,954 | B2 | 11/2011 | Foster et al. |
| 8,549,993 | B2 | 10/2013 | Foster et al. |
| 8,551,331 | B2 | 10/2013 | Burkett et al. |
| 8,584,579 | B1 | 11/2013 | Sumner, Sr. |
| 8,618,447 | B2 | 12/2013 | De' Longhi |
| 8,850,965 | B2 | 10/2014 | Popeil et al. |
| 10,205,605 | B2 | 2/2019 | Han |
| 10,641,274 | B2 | 5/2020 | Chien et al. |
| 2003/0192435 | A1 | 10/2003 | McNair |
| 2003/0205147 | A1 | 11/2003 | Schackmuth et al. |
| 2004/0060456 | A1 | 4/2004 | Chung |
| 2007/0214968 | A1 | 9/2007 | Larson et al. |
| 2007/0251517 | A1 | 11/2007 | Sus et al. |
| 2008/0121578 | A1 | 5/2008 | Burkett et al. |
| 2008/0237104 | A1 | 10/2008 | Foster et al. |
| 2009/0084273 | A1 | 4/2009 | Lackman et al. |
| 2010/0037782 | A1 | 2/2010 | Foster et al. |
| 2011/0203570 | A1 | 8/2011 | Popeil et al. |
| 2012/0167778 | A1 | 7/2012 | Popeil et al. |
| 2014/0227411 | A1 | 8/2014 | Popeil et al. |
| 2014/0302211 | A1 | 10/2014 | Rose et al. |
| 2017/0095118 | A1 | 4/2017 | Loss et al. |
| 2018/0033005 | A1 | 2/2018 | Sines et al. |
| 2019/0032958 | A1 | 1/2019 | Ohse et al. |
| 2020/0046168 | A1 | 2/2020 | Sinnet et al. |
| 2020/0305464 | A1 | 10/2020 | Hohler et al. |
| 2020/0305646 | A1 | 10/2020 | Hohler et al. |
| 2021/0235929 | A1 | 8/2021 | Perkins et al. |

FOREIGN PATENT DOCUMENTS

| | | |
|---|---|---|
| KR | 10-0984964 | 10/2010 |
| KR | 10-1288282 | 7/2013 |
| KR | 10-2017-0064979 | 6/2017 |
| WO | 2019108909 A1 | 6/2019 |
| WO | 2019136406 A1 | 7/2019 |

OTHER PUBLICATIONS

International Searching Authority, Preliminary Report on Patentability issued in International Patent Application No. PCT/US2018/063272 mailed Dec. 2, 2019 (20 pages).
European Patent Office, Extended Search Report issued in EP Application No. 22168774.2-1004 mailed Sep. 22, 2022 (10 pages).
European Patent Office, Extended Search Report issued in EP Application No. 22170595.7-1004 mailed Sep. 28, 2022 (9 pages).
European Patent Office, Extended Search Report issued in EP Application No. 221687775.5-1004 mailed Sep. 30, 2022 (10 pages).

* cited by examiner

AUTOMATED COOKING SYSTEM WITH LIFT PLATFORMS

CROSS-REFERENCE TO RELATED APPLICATION

This application is related to and claims priority to U.S. patent application Ser. No. 17/344,063 filed on Jun. 10, 2021, which claimed priority to U.S. patent application Ser. No. 17/244,096 filed on Apr. 29, 2021, the entire contents of which are herein incorporated by reference.

TECHNICAL FIELD

This application relates generally to food product cooking systems and methods. More specifically, this application describes mechanisms and methods for adding time and labor efficiencies in food production environments such as restaurants.

BACKGROUND

Cooking apparatuses, such as fryers, are used to cook various food products, e.g., poultry, fish, potato products, and the like. Such cooking apparatuses may include one or more cooking chambers, e.g., fryer pots or vats, which may be filled with a cooking medium, e.g., an oil, a liquid shortening, or a meltable-solid shortening. Such cooking apparatuses also may include a heating element, e.g., an electrical heating element, such as a heating coil, or a gas heating element, such as a gas burner and gas conveying tubes, which heats the cooking medium in the cooking chamber. After the cooking medium reaches a preset cooking temperature, food products are placed into the cooking medium such that the food products are cooked in the cooking medium. For example, the food products may be positioned inside a basket, e.g., a wire basket, and submerged in the cooking medium for a predetermined amount of time sufficient to cook the food products. Conventional fryers typically require basket movement and workflow to be handled manually by an operator. In such fryers, the maximum production of the fryer is often limited by the responsiveness of the operator and their ability to manage multiple baskets and cooking tasks at the same time. To this end, it can be quite labor-intensive for an operator to manage basket movements across multiple fryer vats or fryers, as these movements can include each of lifting and lowering the basket relative to the cooking medium, shaking the baskets and the food products container therein, and moving baskets for loading or unloading of food products.

However, restaurants continue to strive to increase production in order to satisfy customer demand. One way to increase production is to utilize a high-volume fryer, such as by replacing a restaurant's pre-existing traditional open fryer with a high-volume fryer. However, high-volume fryers are typically relatively large, and restaurants must operate within the space constraints imposed by the buildings which they occupy. As a result, restaurant equipment, including fryers, must be sized to fit within certain parameters. For example, kitchen layouts may allow a particular amount of space for a fryer and may be unable to accommodate fryers having footprints greater than that space. Some restaurants may allow a footprint of about 90-100 inches by about 30 inches for a fryer, as well as an associated preparation or holding area. A high-volume fryer of a conventional design may require significantly more space than this. Many restaurants would be required to undergo substantial building renovations, replace previously installed hoods, or sacrifice space intended for other uses in order to reap the benefits of high-volume fryers. Those reconfigurations are expensive, highly disfavored, and sometimes impossible.

Thus, it would be desirable to provide systems and methods to cook food product in a more efficient manner, specifically with regard to time and labor considerations within a restaurant, while also achieving higher maximum production levels than traditional fryer systems and methods relying on manual manipulation and handling of baskets.

SUMMARY

In accordance with embodiments of the invention, aspects of an automated cooking system with lift platforms for managing basket workflow during food preparation are described. Aspects of the automated cooking system help to avoid the problems associated with manually operating a cooking system. Specifically, the aspects of the automated cooking system described herein provides for systems and methods to prepare food product in a more efficient manner with regard to time and labor considerations within the constraints of a restaurant.

In one implementation of the invention, a fryer for use with an automated cooking system is provided. The fryer includes a plurality of fryer vats, each configured to hold a cooking medium, and each defining one or more cooking stations at the fryer. The fryer also includes at least one heating element disposed within each of the fryer vats. The fryer further includes a vertical transport assembly located proximate to and associated with each of the fryer vats, the vertical transport assembly configured to support and move a basket of food product into and out of the cooking medium at the fryer vat. Each vertical transport assembly includes a lift base mounted proximate to the associated fryer vat and containing a motor. Each vertical transport assembly further includes a platform support hanger extending from the lift base and operatively coupled to the motor, such that the motor actuates to generate movement of the platform support hanger relative to the fryer vat. Each vertical transport assembly also includes a basket support platform removably connected to the platform support hanger, the basket support platform includes a support arm extending generally vertically to connect with the platform support hanger and a tray-shaped platform portion extending generally horizontally from the support arm. The tray-shaped platform portion is configured and shaped to circumferentially surround a bottom portion of a basket set onto the basket support platform, to thereby retain the basket during movements towards and away from the cooking medium.

In one embodiment, the platform portion of the basket support platform is defined by a wire rack construction including a peripheral wire, which defines an outer periphery of the platform portion and an open top for the basket support platform. The platform portion of the basket support platform is further defined by a plurality of lateral cross wires and longitudinal cross wires that extend across a width and length surrounded by the peripheral wire, thereby collectively defining a support surface for receiving the basket.

In another embodiment, each of the lateral cross wires and longitudinal cross wires extend generally horizontally along a length thereof except adjacent connection points to the peripheral wire. Angled or bent portions are located adjacent the connection points such that the platform portion collectively defines an angled entry taper that narrows from the open top to the support surface. The angled entry taper guides the basket during insertion into the open top to correct any misalignments between the basket support platform and the basket as a bottom wall of the basket is moving into engagement with the support surface.

In yet another embodiment, the peripheral wire is located directly adjacent side walls of the basket when the bottom wall of the basket is engaged with the support surface. Additionally, each of the lateral cross wires extends above at least one of the longitudinal cross wires and extends below at least one of the longitudinal cross wires such that the lateral cross wires and longitudinal cross wires collectively define an interwoven construction at the support surface.

In a further embodiment, the platform portion of the basket support platform includes a top peripheral edge and a support surface located in elevation below the top peripheral edge. The top peripheral edge defines an open top for the basket support platform that is larger in size than the support surface such that the basket support platform includes an angled entry taper that narrows from the open top to the support surface. The angled entry taper guides the basket during insertion into the open top to correct any misalignments between the basket support platform and the basket as a bottom wall of the basket is moving into engagement with the support surface.

In one embodiment, the platform support hanger includes a hook receptacle and the support arm of the basket support platform includes a lateral rod sized to be inserted within the hook receptacle to releasably couple the support arm to the platform support hanger. Further, the platform support hanger includes a plurality of hook receptacles located at different elevations along a height of the platform support hanger. The support arm of the basket support platform includes a plurality of lateral rods sized and positioned to be inserted within the plurality of hook receptacles to releasably couple the support arm to the platform support hanger.

In another embodiment, the lift base includes a housing and a front panel that is moveably connected to the housing and driven to move upwardly and downwardly by the motor contained within the housing. The front panel includes connection elements configured to removably engage with connection elements on the platform support hanger such that the platform support hanger extends downwardly below a bottom end of the front panel. Additionally, at least one of the connections between the platform support hanger and the lift base or the basket support platform is configured to allow pivotal relative movement such that the basket support platform and/or the platform support hanger can be pivoted upwardly away from the fryer vat to allow the fryer vat to be accessed for cleaning or maintenance.

In yet another embodiment, the lift base for each vertical transport assembly is mounted on the frame behind and above a top opening of a respective fryer vat, thereby keeping a front end of baskets supported on the vertical transport assembly fully accessible for manipulation and movement by a gantry that may be included in the automated cooking system for moving baskets around to cooking stations. Further, when a basket is loaded onto the basket support platform, the motor of the vertical transport assembly is controlled to move the basket and the basket support platform between an upper position, in which the basket is located above the cooking medium, and a lower position, in which the basket is substantially submerged in the cooking medium.

In a further embodiment, the motor of the vertical transport assembly is further controlled to rapidly move the basket and the basket support platform in a reciprocating manner to selectively shake the basket while at or near the lower position to break up product marriages of food product that may develop during a cooking cycle at the fryer. Additionally, the movements of the basket and the basket support platform between the upper position and the lower position and the shaking movements of the basket and the basket support platform generated by the motor are both defined by generally vertical up-and-down movements. An amplitude and a frequency of shaking movements generated by the motor at the basket are adjustable.

In another implementation of the invention, a method of cooking food products with an automated cooking system is provided. The method includes providing a fryer. The fryer includes a plurality of fryer vats, each configured to hold a cooking medium, and each defining one or more cooking stations at the fryer. The fryer also includes a vertical transport assembly located proximate to and associated with each of the fryer vats. Each vertical transport assembly includes a lift base mounted proximate to the associated fryer vat and containing a motor. Each vertical transport assembly further includes a basket support platform including a support arm extending generally vertically to be operatively connected with the lift base and a tray-shaped platform portion extending generally horizontally from the support arm. The method further includes setting a basket of food product onto the tray-shaped platform portion of the vertical transport assembly. The tray-shaped platform portion circumferentially surrounds a bottom portion of the basket to retain the basket for further movements at the vertical transport assembly. The method also includes moving the basket downwardly, by the vertical transport assembly, to a lower position in which the basket is substantially submerged in the cooking medium held within the fryer vat, thereby beginning a cooking cycle for the food products. The method additionally includes moving the basket upwardly, by the vertical transport assembly, to an upper position in which the basket is located above the cooking medium in the fryer vat, when the cooking cycle is completed.

In one embodiment, the platform portion of the basket support platform is defined by a wire rack construction including a peripheral wire. The peripheral wire defines an outer periphery of the platform portion and an open top for the basket support platform. The platform portion is further defined by a plurality of lateral cross wires and longitudinal cross wires that extend across a width and length surrounded by the peripheral wire, thereby collectively defining a support surface for receiving the basket. Further, and the method step of setting the basket of food product onto the platform portion further includes engaging a bottom wall of the basket with the support surface.

In another embodiment, the platform portion of the basket support platform includes a top peripheral edge and a support surface located in elevation below the top peripheral edge. The top peripheral edge defines an open top for the basket support platform that is larger in size than the support surface such that the basket support platform includes an angled entry taper that narrows from the open top to the support surface. Further, the method step of setting the basket of food product onto the platform portion further includes inserting the basket into the open top of the basket support platform and guiding the basket to the basket support platform by the angled entry taper. Additionally, the method step of setting the basket of food product onto the platform portion includes correcting misalignments between the basket support platform and the basket by laterally moving the basket with the angled entry taper as a bottom wall of the basket is moving towards and into engagement with the support surface.

In yet another embodiment, the method further includes rapidly moving the basket and the basket support platform in a reciprocating manner to selectively shake the basket while at or near the lower position to break up product marriages of food product that may develop during a cooking cycle at the fryer. Movements of the basket are defined by generally vertical up-and-down movements of the basket and the basket support platform, which are generated by the motor.

In a further embodiment, the method of cooking food products further includes adjusting an amplitude and a frequency of the generally vertically up-and-down movements of the basket generated by the motor, to thereby vary the shaking of the basket.

In another embodiment, the step of setting a basket of food product onto the platform portion is performed by a gantry that manages basket movements across the automated cooking system.

The steps and elements described herein as part of various embodiments and aspects can be reconfigured and combined in different combinations to achieve the desired technical effects as may be desired. To this end, the embodiments and aspects can be combined in any combination or sub-combination.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
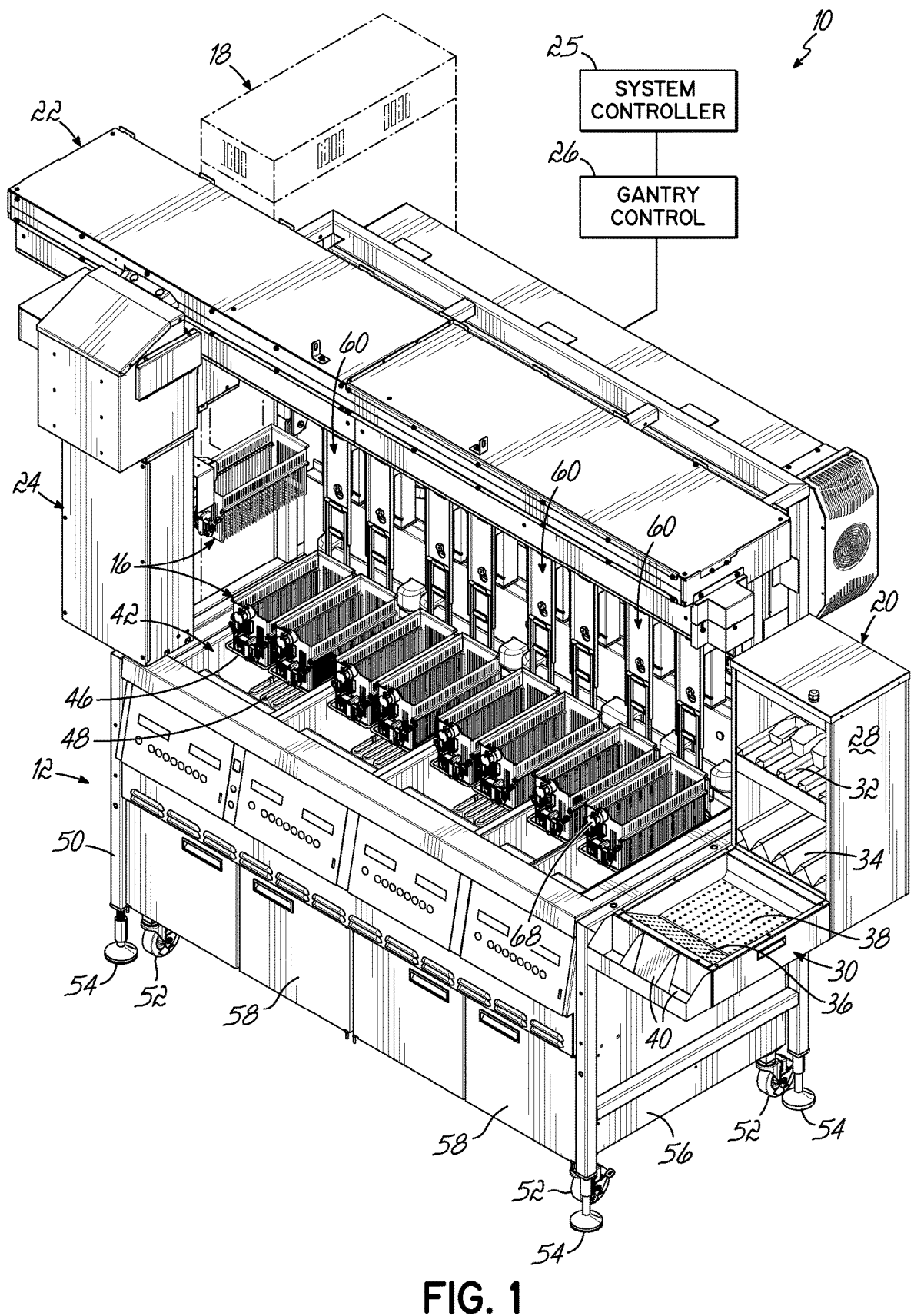
FIG. 1 is a front perspective view of an automated cooking system in accordance with an embodiment of the invention.
Figure 2:
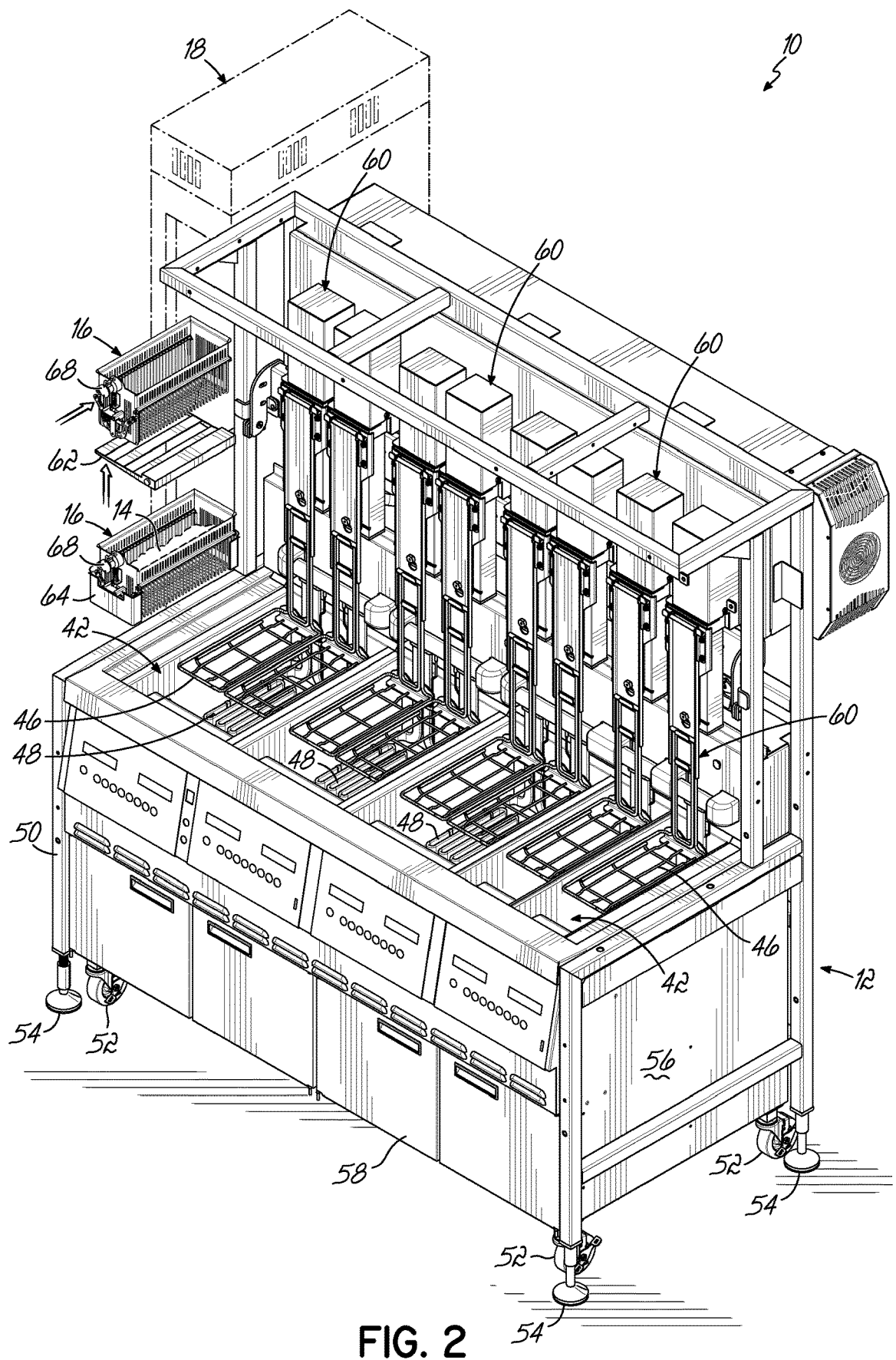
FIG. 2 is a front perspective view of a fryer included in the automated cooking system of FIG. 1, but with the gantry removed for purposes of illustration.
Figure 3:
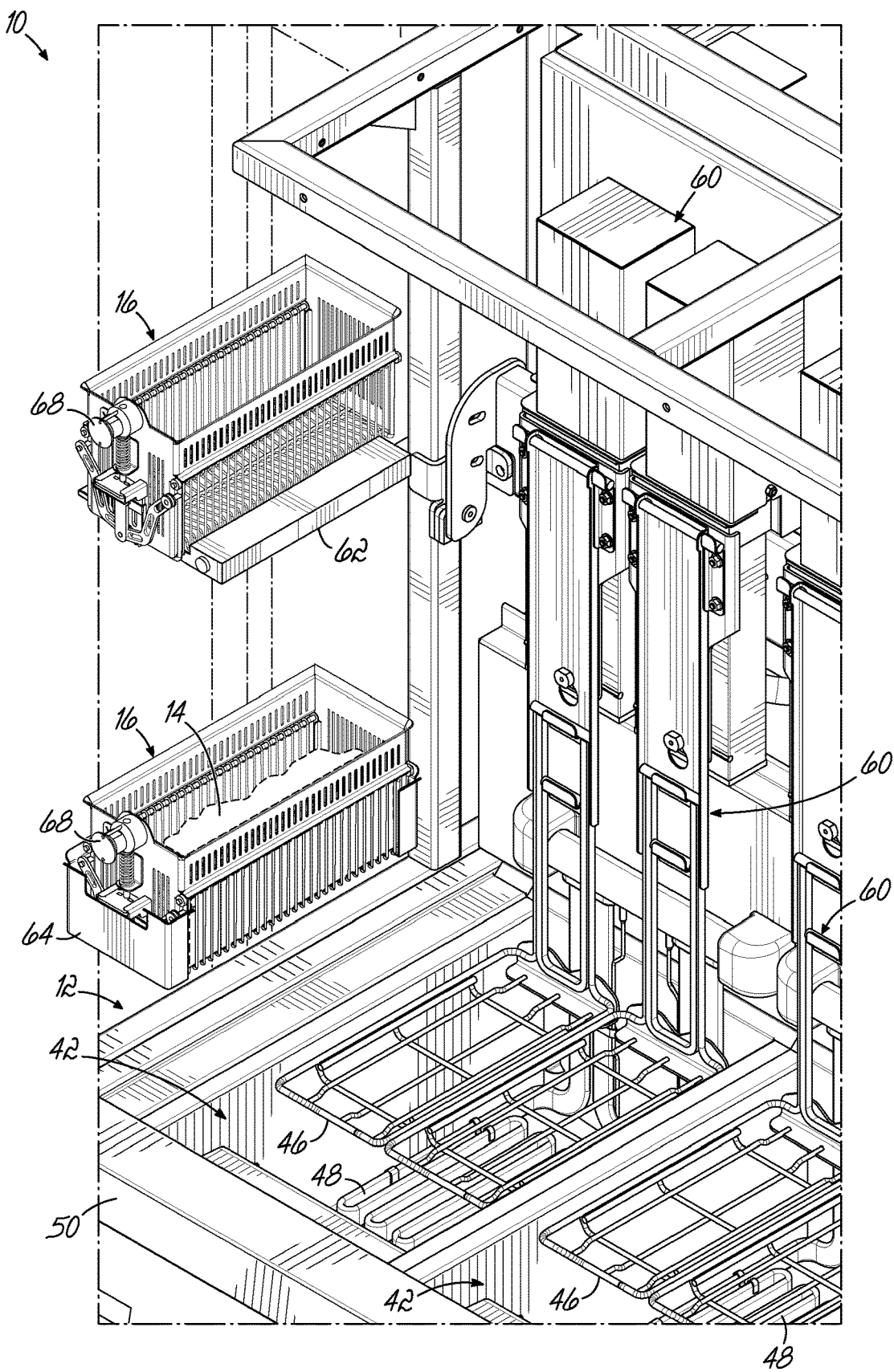
FIG. 3 is an enlarged, front perspective detail view of a portion of the fryer of FIG. 2.

With reference to FIGS. 1-3, an automated cooking system 10 including a fryer 12 is shown in accordance with one exemplary embodiment. As set forth in further detail below, the system 10 and fryer 12 provide improved efficiency in cooking operations. The cooking system 10 achieves the increased production by efficiently managing the workflow of baskets 16 moving between a dispensing freezer 18, the fryer 12, and a hot holding station 20. The workflow of baskets 16 is achieved, at least in part, by using a gantry system 22 as well as vertical transport assemblies 60. The gantry system 22 includes a gantry 24 and a gantry control 26, which may be a part of or separate from a system controller 25 for the automated cooking system 10. Vertical transport assemblies 60 of this system 10 lift and lower baskets 16 into and out of the cooking medium 44 of the fryer vats 42 using innovative combinations of elements as described below to cook food product 14 in a more efficient manner, and thereby achieve higher maximum production levels with less labor cost than traditional fryer systems and methods relying on manual manipulation and handling of baskets. The features of the automated cooking system 10 and the fryer 12 are set forth in further detail below to clarify each of these functional advantages and other benefits provided in this disclosure. Other advantages and technical effects of the embodiments of this invention will become evident to one skilled in the art from the following description.

Continuing with reference to FIG. 1, an exemplary automated cooking system 10 is shown. The automated cooking system 10 includes the fryer 12, a plurality of baskets 16, a dispensing freezer 18, a hot holding station 20, and a gantry system 22. The dispensing freezer 18 is of a mostly conventional design, and thus, is not shown in significant detail in the Figures. However, the dispensing freezer 18 shown in this embodiment includes a dispenser (not shown) for dispensing food product 14. Food product 14, for example, waffle fries, are dispensed into a basket 16 from the dispenser of the dispensing freezer 18, cooked in the fryer 12, and then transferred from the fryer 12 to the hot holding station 20 via the baskets 16. While a basket 16 is shown and described, it is appreciated that other moveable food product receptacles are also envisioned.

The hot holding station 20 of the embodiment shown in FIG. 1 receives cooked food product 14 from the basket 16 of the fryer 12, to thereby enable operator manipulation and packaging to finalize preparation of the food products for delivery to fulfill customer demands, as well understood in the restaurant field. The hot holding station 20 is of conventional design and is briefly described as follows: it includes a hot holding cabinet 28 and a hot holding receiving area 30. As shown, the hot holding cabinet 28 may include a plurality of vertical slots 32 or angled corrugated slots 34 to hold the now cooked food product 14. For example, the hot holding receiving area 30 may include an angled front portion 36, and a plurality of apertures 38 to enable circulating air flow to help the cooked food product 14 remain in a desirable state. Receptacles 40 for holding packaging to load food products into may be located in the front of the hot holding receiving area 30. Since the throughput of this automated cooking system 10 exceeds current systems, the hot holding receiving area 30 is generally larger to enable one or more workers to package the cooked food product 14 and keep up with the throughput of the automated cooking system 10. It will be understood that other types of hot holding 20 and preparation stations may be used with the fryer 12 in other embodiments. For example, an automated holding and packaging station may be later developed and combined with the features of the automated cooking system 10, without departing from the scope of this disclosure.

Still referring to FIG. 1, interfacing with a touch-screen control (not shown) or the like according to an embodiment, the operator selects the quantity of food product 14 and the repeating rate upon which they wish to cook, and the automated cooking system 10 automatically optimizes the dispensing schedule from the freezer 18 and where to perform the cooking within the fryer 12. It will be understood that the food products to be cooked and the production rate may also be communicated to the cooking system 10 by other methods, including wireless communication from order management computer(s) that receive customer demands for food product 14 and facilitate restaurant employees with fulfilling customer demands and orders accordingly. Regardless of how the control parameters are set, the automated cooking system 10 generally operates as follows: it automatically raises the predetermined basket 16, moves the basket 16 to the position to accept the uncooked food product 14, moves the basket 16 to the proper cooking chamber, e.g., fryer vat 42, location, lowers the basket 16 into the cooking medium 44, raises the basket 16 once cooked and moves the basket 16 to be dispensed into the hot holding receiving area 30, and then moves the basket 16 back to a predetermined location at the fryer 12 or back to the freezer 18 to accept more uncooked food product 14.

In an embodiment, the system controller 25 of the automated cooking system 10 may be configured to implement different modes of the system 10 or fryer 12. In any event, the system controller 25 may be operatively coupled to a dispensing mechanism of the dispensing freezer 18 to enable coordination between the dispensing of uncooked food product 14 from the dispensing freezer 18 into the basket 16, such that a predetermined amount of food product 14 is dispensed into the basket 16. The system controller 25 may also interface with other equipment in a fully automated fashion, to cause cooking of food product 14 in response to customer orders or demand. To this end, while the system controller 25 is referred to separately from the gantry control 26 previously described and shown in FIG. 1, it will be appreciated that the gantry control 26 may be an integral part of a single system controller 25 operating all elements of the cooking system 10 without departing from the scope of this invention.

Also initially shown in FIG. 1, the fryer 12 also includes a gantry system 22 that is configured to move a basket 16 between a plurality of positions at the fryer 12. The gantry system 22 includes a gantry 24. The gantry 24 is moved by the gantry system 22 using a motor (not shown) which is controlled using a gantry control 26 enabling the gantry 24 to move to a desired position. The gantry control 26 interfaces with or is part of a system controller 25 (schematically shown in FIG. 1). The gantry system 22 is configured to service each platform 46 associated with each fryer vat 42 with a basket 16. Specifically, a clamping gripper 66 of the gantry 24 engages with a single pickup point 68 on the basket 16 to permit the gantry 24 to move the basket 16 from location to location.

Referring now to FIG. 2, an exemplary embodiment of the fryer 12 used in the automated cooking system 10 is shown. The system 10 includes a frame 50 mounted on a plurality of casters or wheels 52, so that the fryer 12 may be easily moveable on a surface, such as a floor. In one embodiment, one or more of the wheels 52 are lockable to prevent unwanted movement of the fryer 12 during operation. In a further embodiment, the frame 50 includes feet 54 so that the frame 50 of the system 10 is not placed directly onto a surface, such as a floor. In one embodiment, the feet 54 are adjustable such that the system 10 can be raised or lowered to a desired height above a surface, such as a floor. Alternatively, the wheels 52 or feet 54 may be eliminated if desired. A plurality of wall panels 56 are provided on the frame 50 to strengthen the frame 50. Various fryer 12 components such as, for example, oil filtration and recirculation components, may be supported by or housed by the frame 50 within the wall panels 56. These components are of a conventional design, and thus, are not shown in detail in the figures. Cabinets 58 may be located near the bottom of the fryer 12 and may be used to remove already-used cooking medium 44. According to another embodiment, cabinets 58 may be used as storage for unused cooking medium 44 or other products.

With continued reference to FIG. 2, in an embodiment, the fryer 12 includes five fryer vats 42, each configured to hold a cooking medium 44. As shown, each fryer vat 42 is configured to hold at least one basket 16. However, more or fewer fryer vats 42 are also envisioned, with each fryer vat 42 being configured to hold one or more baskets 16. For example, the fryer 12 may feature three fryer vats 42 wherein each fryer vat 42 is configured to accommodate two platforms 46 (and thus two cooking baskets 16) each, for a total of six platforms 46 and six baskets 16. At least one heating element 48 is disposed within each fryer vat 42. However, it is envisioned that each fryer vat 42 may include any suitable number of heating elements 48 in any arrangement, as may be desired. The heating element 48 is configured to heat the cooking medium 44 to a predetermined temperature so as to cook the food products 14 therein. Further, the fryer 12 advantageously includes vertical transport assemblies 60, which are configured to raise and lower the baskets 16 into and out of the fryer vats 42 on platforms 46 attached to the vertical transport assemblies 60. The vertical transport assemblies 60 are addressed in greater detail below. It is envisioned that each fryer vat 42 may contain a single basket 16, which is movable on a platform 46 of one of the vertical transport assemblies 60. Alternatively, a fryer vat 42 may accommodate two or more baskets 16, each moveable on a separate platform 46 on a separate vertical transport assembly 60. It is also envisioned that a basket 16 may be used with different fryer vats 42 or different platforms 46 of the vertical transport assemblies 60. Mounted in the rear of the frame 50 are the motors and other corresponding components (not shown) for each of the vertical transport assemblies 60.

Referring now to FIG. 3, the Figure shows a portion of the fryer 12 adjacent the dispensing freezer 18. At the dispensing freezer 18, a staging shelf 62 is shown in a deployed position and supporting an empty basket 16. In the deployed position, the staging shelf 62 is in a generally horizontal orientation such that a basket 16 can be placed on the staging shelf 62 by the gantry 24. When not supporting a basket 16, the staging shelf 62 can alternatively be in a stowed position. In the stowed position, the staging shelf 62 is generally vertical such that the staging shelf 62 cannot support a basket 16. In an embodiment, the state of the staging shelf 62 (e.g., in the deployed or stowed position) is determined by the system controller 25 in communication with the gantry control 26. FIG. 3 also shows a basket 16 filled with uncooked food product 14 located in a basket movement receptacle 64. The basket movement receptacle 64 of this embodiment defines a generally U-shaped support surrounding an open slot facing generally towards the staging shelf 62. In FIG. 3, the basket movement receptacle 64 is located in a pickup position and is waiting for the gantry control 26 to direct the gantry system 22 to move the gantry 24 to the location of the basket movement receptacle 64, in the pickup position, to pick up a basket 16. The gantry 24 will move the basket 16 filled with uncooked food product 14 from the basket movement receptacle 64, in the pickup position, to one of the empty platforms 46 at the fryer 12 in preparation for the food product 14 to be cooked by the cooking medium 44 in the corresponding fryer vat 42. Such cooking is effectuated by the vertical transport assemblies 60.

Figure 4:
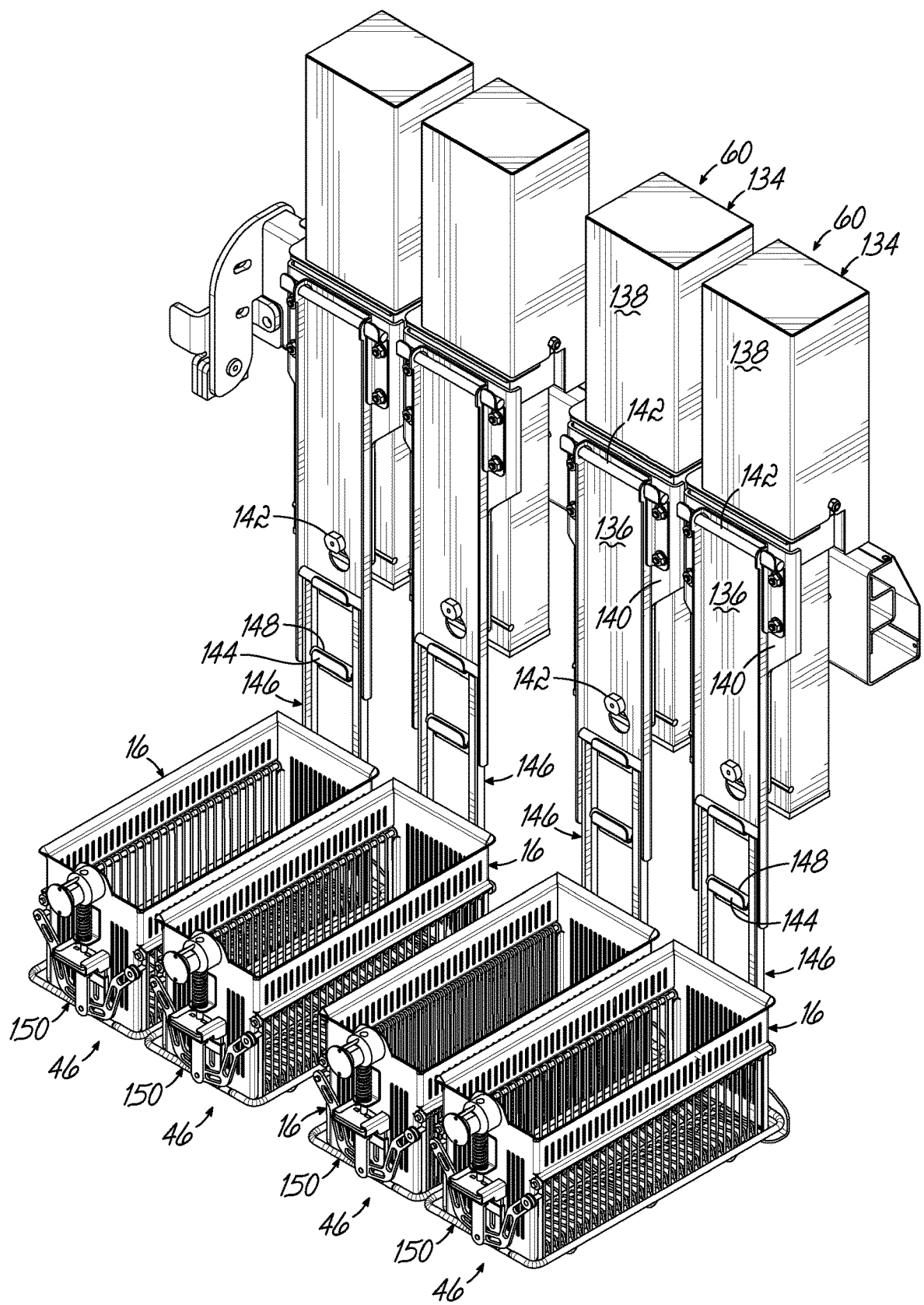
FIG. 4 is a front perspective view of a series of vertical transport assemblies.

Referring now to FIG. 4, the Figure shows a series of vertical transport assemblies 60 with baskets 16 engaged with the platforms 46 of the assemblies 60. Broadly, the vertical transport assemblies 60 are configured to support and transport baskets 16 of food product 14 upwardly and downwardly relative to the fryer vats 42—thereby moving the baskets 16 of food product 14 into and out of the cooking medium 44 of the fryer vats 42. As shown best in FIGS. 1 and 2, a portion of each vertical transport assembly 60 is mounted in a stationary manner on the frame 50 of the fryer 12. Generally, the vertical transport assemblies 60 are located proximate to (e.g., on a rear end of the fryer 12) and associated with each of the fryer vats 42 (e.g., located and above the fryer vats 42). Specifically, a portion of each vertical transport assembly 60 is mounted on the frame 50 of the fryer 12 behind and above a top opening of a respective fryer vat 42. This configuration allows for a front end of baskets 16 to be supported on the vertical transport assembly 60 while remaining fully accessible for manipulation and movement by the gantry 24.

Figure 5A:
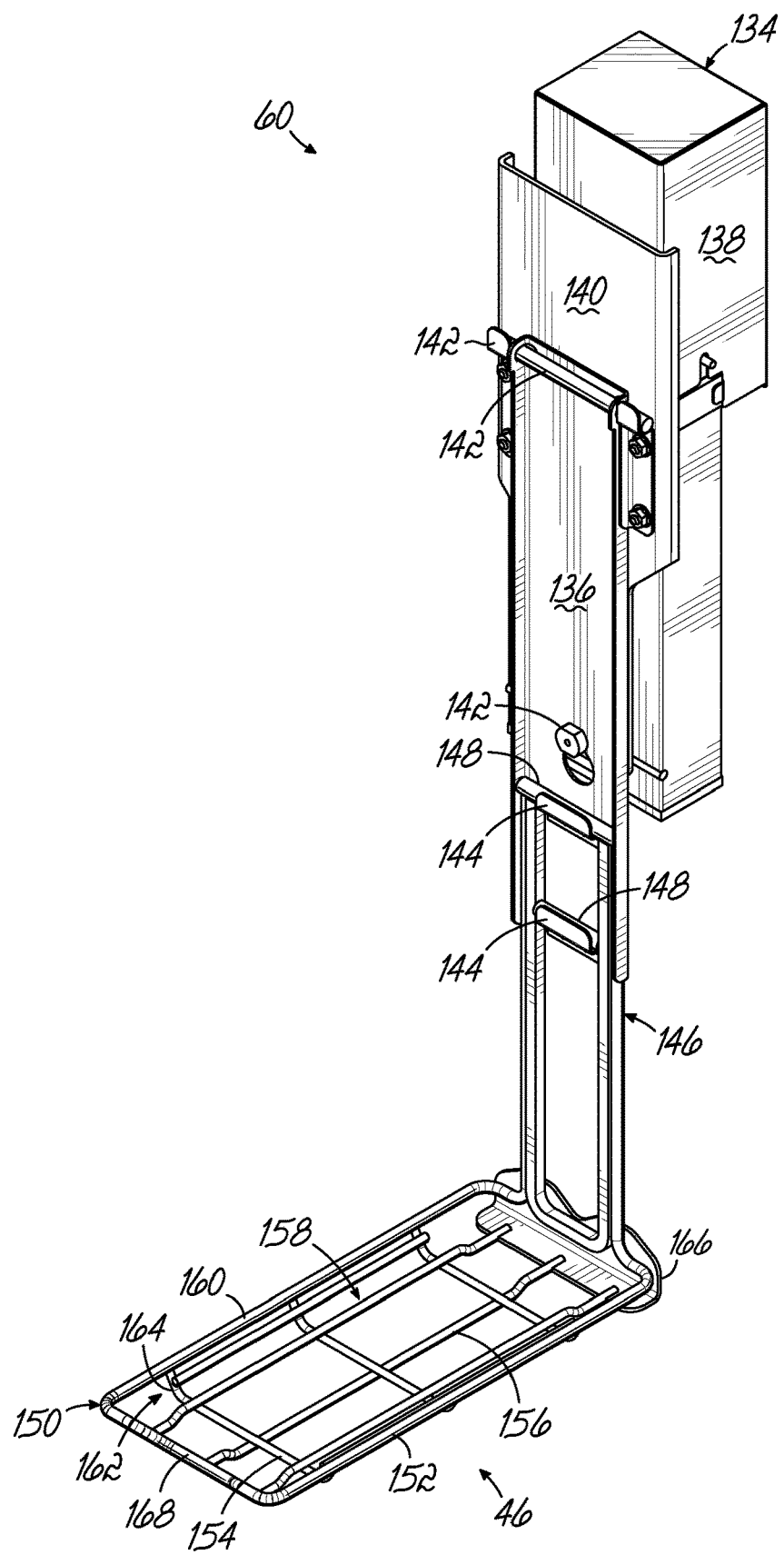
FIG. 5A is a front perspective view of a vertical transport assembly included in the series of vertical transport assemblies of FIG. 4.
Figure 5B:
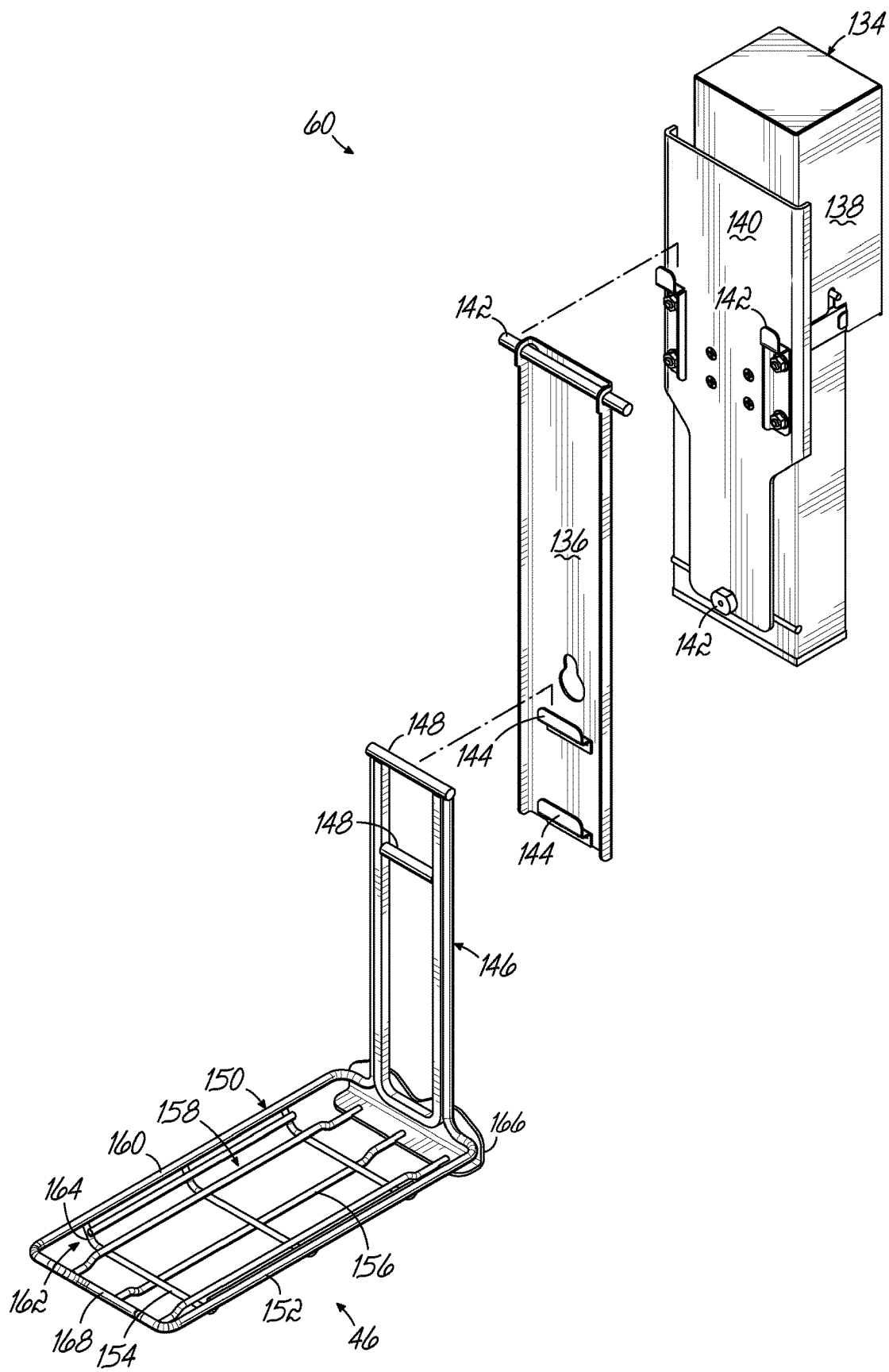
FIG. 5B is an exploded front perspective view of the vertical transport assembly of FIG. 5A.

As shown in FIGS. 5A and 5B, each vertical transport assembly 60 includes a lift base 134, a platform support hanger 136, and a basket support platform 46. The lift base 134 is mounted on the frame 50 and contains a motor (not shown). The platform support hanger 136 extends from the lift base 134 and is operatively coupled to the motor. The lift base 134 of this embodiment more specifically includes a housing 138 and a front panel 140 that covers a portion of and is moveably connected to the housing 138. The front panel 140 includes connection elements 142 configured to removably engage with connection elements 142 on the platform support hanger 136 such that when the platform support hanger 136 is attached to the front panel 140, the platform support hanger 136 extends downwardly below a bottom end of the front panel 140. The platform support hanger 136 includes a hook receptacle 144 for receiving a portion of the basket support platform 46. In a further embodiment, the platform support hanger 136 includes a plurality of hook receptacles 144 located at different elevations along a height of the platform support hanger 136 for receiving a portion (or portions) of the basket support platform 46.

Figure 7A:
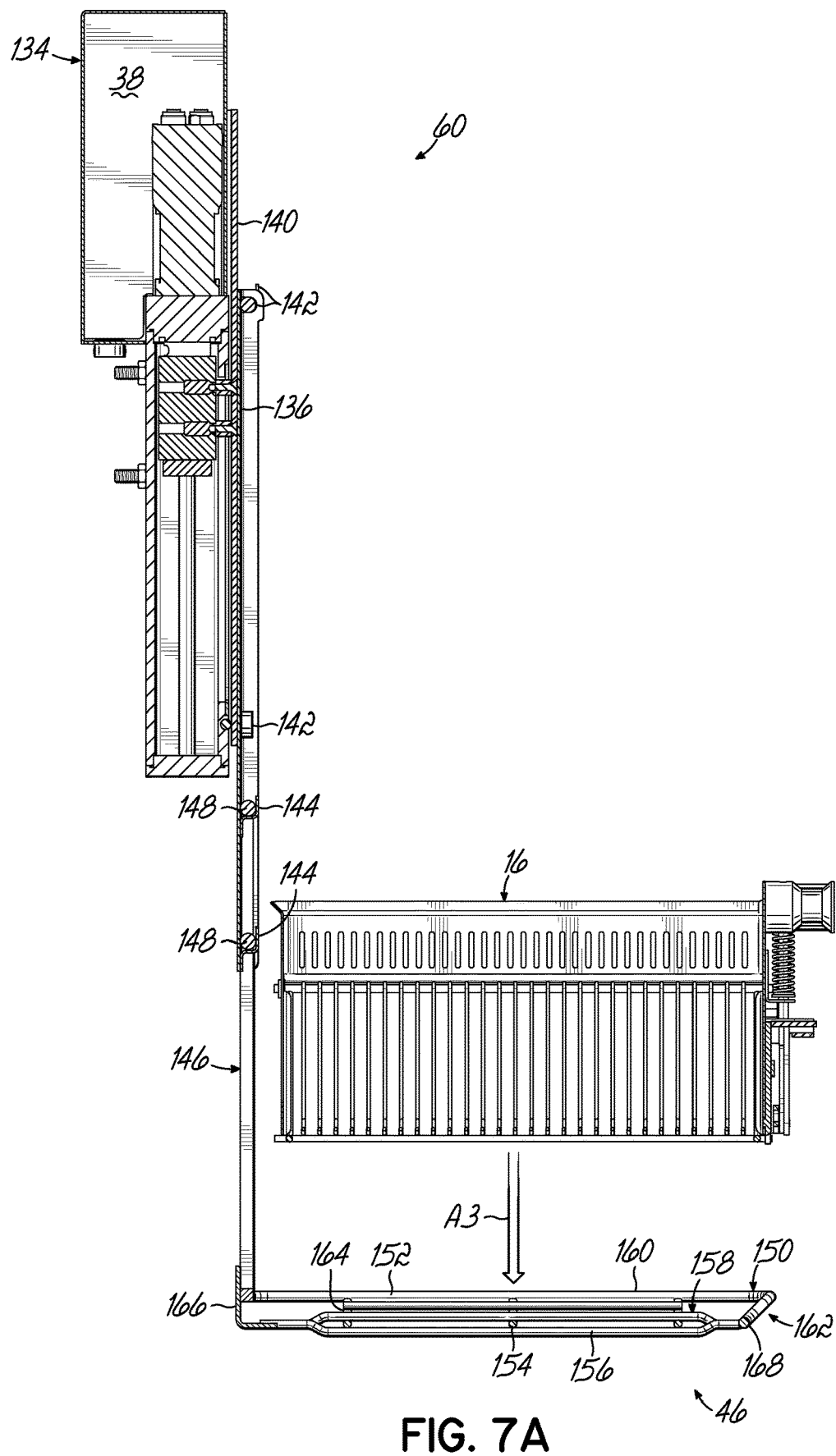
FIG. 7A is a side view of the vertical transport assembly and the fryer basket of FIGS. 5C and 5D.

The front panel 140 is driven to move upwardly and downwardly by the motor contained within the housing 138 of the lift base 134. In turn the motor actuates to generate movement of the platform support hanger 136 (attached to the front panel 140) relative to the fryer vat 42. It will be understood that the operative connection between a motor and the front panel 140 may be made by a gear or by a number of gears (or similar). In an embodiment, a drive gear engages in a meshed engagement with a toothed rack in a rack-and-pinion arrangement, thereby causing up-and-down or generally vertical translation of the front panel 140 of the lift base 134 based on rotations of the drive gears. The motor is selected so that it can rotate drive gears in either direction as needed. It will further be understood that other embodiments of the vertical transport assembly 60 can include alternative drive mechanisms for achieving movements of the various components of the vertical transport assembly 60. For example, a timing-belt based drive system could be used to link an input drive/motor with the front panel 140 of the lift base 134. Other known drive mechanisms may also be substituted as the "motor" for generating the multiple types of generally vertical up-and-down movement according to further embodiments of this invention. Moreover, though one example of the interior drive structures that may be within the housing 138 is schematically shown in FIG. 7A described below, it will be understood that this interior drive structure may vary in the embodiments of the present invention.

Still referring to FIGS. 5A and 5B, the basket support platform 46 is removably connected to the platform support hanger 136 and includes a support arm 146. Particularly, the support arm 146 of the basket support platform 46 includes a lateral rod 148 sized and configured to be inserted within the hook receptacle 144 of the platform support hanger 136 to releasably couple the support arm 146 of the basket support platform 46 to the platform support hanger 136. In a further embodiment, the support arm 146 of the basket support platform 46 includes a plurality of lateral rods 148 sized and positioned to be inserted within the plurality of hook receptacles 144 of the platform support hanger 136 to releasably couple the support arm 146 to the platform support hanger 136. Further, at least one of the connections between the platform support hanger 136 and the lift base 134 or the basket support platform 46 is configured to allow pivotal movement such that the basket support platform 46 and/or the platform support hanger 136 can be pivoted upwardly away from the fryer vat 42 to allow the fryer vat 42 to be accessed for cleaning or maintenance. For example, at least one of the lateral rods 148 and the corresponding hook receptacle 144 are formed with a cylindrical or rounded shape that allows for relative rotation of the elements noted. The support arm 146 extends in a generally vertical direction (away from the rest of the basket support platform 46) and connects the platform support hanger 136 with a tray-shaped platform portion 150.

The tray-shaped platform portion 150 extends in a generally horizontal direction out from the support arm 146. As will be discussed in greater detail below, the tray-shaped platform portion 150 is configured and shaped to circumferentially surround a bottom portion of a basket 16 when the basket 16 is set onto the basket support platform 46. The configuration and shape of the tray-shaped platform portion 150 serves to reliably retain the basket 16 during movements of the vertical transport assembly 60 towards and away from the fryer vat 42 and cooking medium 44. In this regard, the platform portion 150 prevents any lateral swinging movements of the basket 16 during a cooking cycle, which helps achieve less basket "touches" or undesirable contacts between baskets 16 in adjacent fryer vats 42.

Figure 5C:
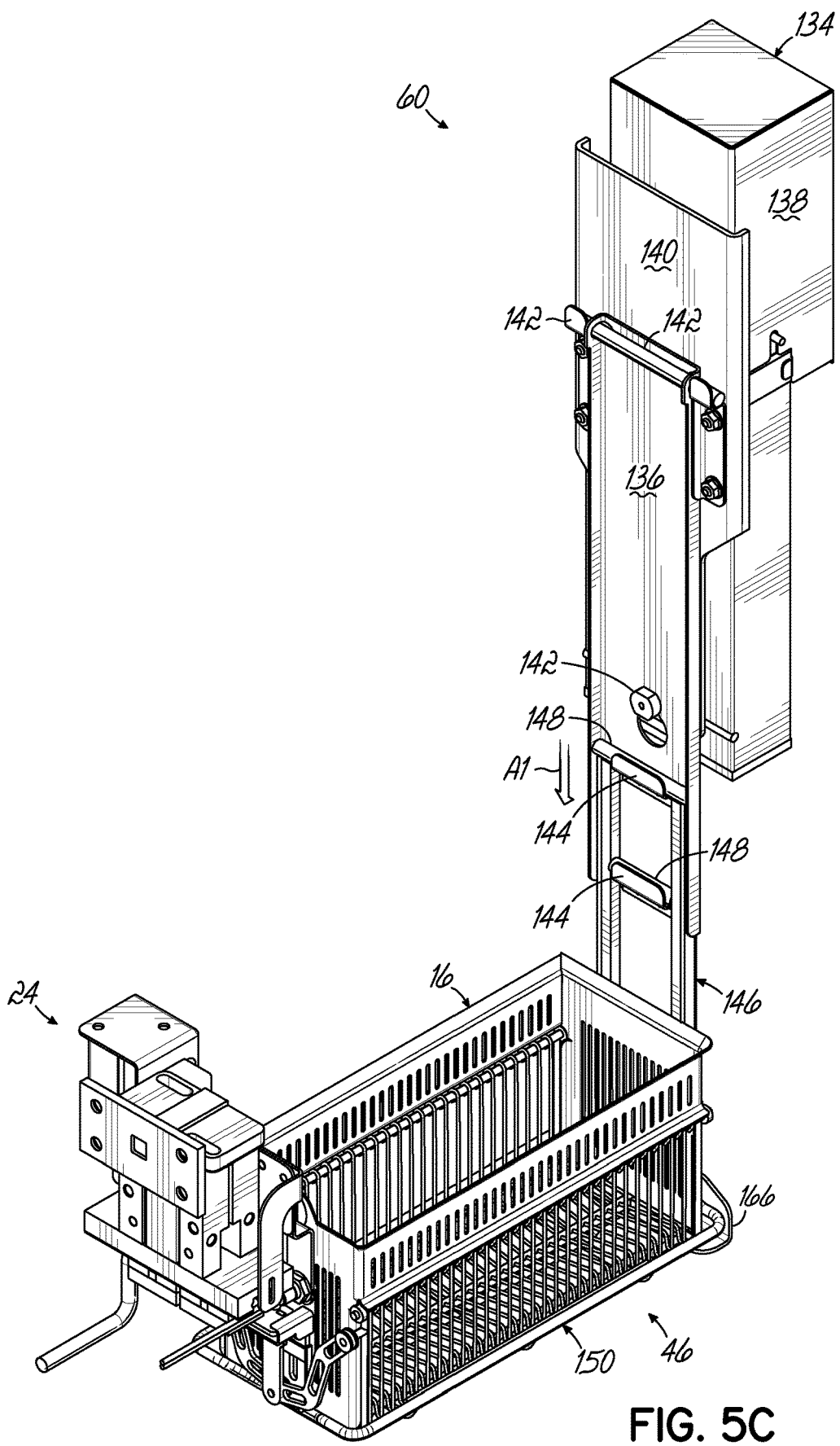
FIG. 5C is a front perspective view of the vertical transport assembly of FIG. 5A, showing the vertical transport assembly in a retracted state with a fryer basket loaded thereon and a portion of the gantry also shown to illustrate the gantry dropping off or picking up the fryer basket.
Figure 5D:
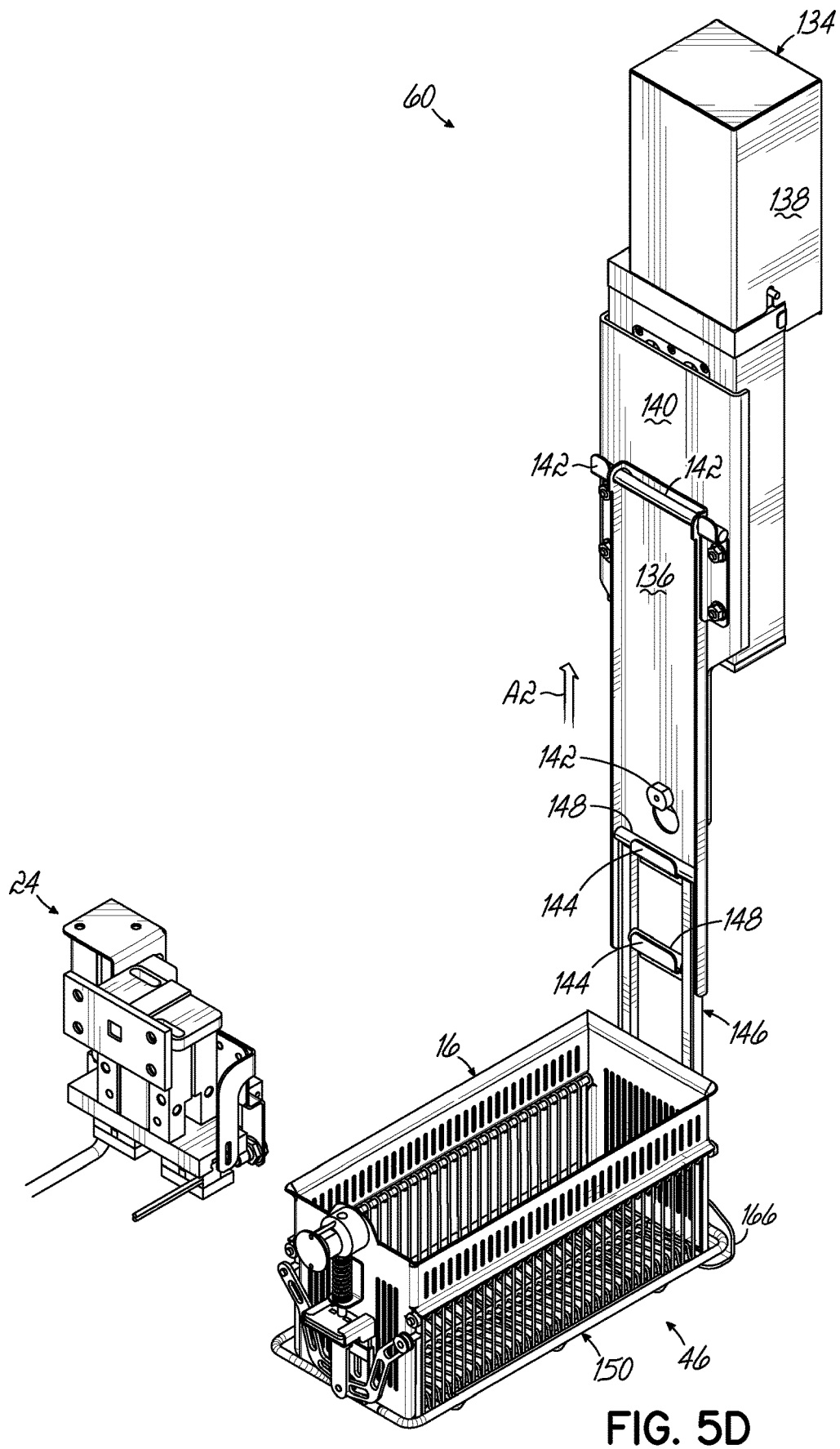
FIG. 5D is a front perspective view of the vertical transport assembly of FIG. 5C, showing the vertical transport assembly in an extended state.

Referring now to FIGS. 5C and 5D, the Figures show the various positions of the vertical transport assembly 60—namely, an upper position (FIG. 5C) and a lower or cooking position (FIG. 5D). Generally, when a basket 16 is loaded onto the basket support platform 46, the motor of the vertical transport assembly 60 is controlled to move the basket 16 and the basket support platform 46 between an upper position (FIG. 5C), in which the basket 16 is located above the cooking medium 44, and a lower position or cooking position (FIG. 5D), in which the basket is substantially submerged in the cooking medium 44.

FIG. 5C shows the vertical transport assembly 60 in a retracted state and at an upper position in which a basket 16 would be positioned above the fryer vat 42 and cooking medium 44. In this upper position, food products 14 are not immersed in cooking medium and thus may be loaded or unloaded from the basket 16 as necessary, and the basket 16 may be temporarily removed from engagement from the vertical transport assembly 60 (e.g., by the gantry 24) to perform these functions. To arrive at the upper position, the vertical transport assembly 60 (e.g., motor) is actuated to move the front panel 140 and thus the platform support hanger 136 and basket support platform 46 upwardly from the lower position. Further, as shown by arrow A1, the vertical transport assembly 60 is preparing (or ready) to move (via a motor or similar) the platform support hanger 136 and the basket support platform 46 downwardly to a lower position (or cooking position).

FIG. 5D shows the vertical transport assembly 60 in an extended state and at a lower position in which a basket 16 attached to the basket support platform 46 would be substantially submerged in the cooking medium 44 in a fryer vat 42. This lower position may also be referred to as the cooking position. To arrive at the lower position, the vertical transport assembly 60 (e.g., motor) is actuated to move the front panel 140 and thus the platform support hanger 136 and basket support platform 46 downwardly from the upper position. Further, as shown by arrow A2, the vertical transport assembly 60 is preparing (or ready) to move (via a motor or similar) the platform support hanger 136 and the basket support platform 46 upwardly to an upper position.

Referring again to FIGS. 5C and 5D, the motor of the vertical transport assembly 60 can be further controlled to rapidly move the basket 16 and the basket support platform 46 in an up-and-down reciprocating manner (e.g., shaking). As described in greater detail below with respect to FIG. 9A, selectively shaking the basket 16, including while the basket 16 is at or near the lower position, serves to break up product marriages of food product 14 that may develop during a cooking cycle at the fryer 12. The movements of the basket 16 and the basket support platform 46 between the upper position (FIG. 5C) and the lower position (FIG. 5D) and the shaking movements of the basket 16 and the basket support platform 46 generated by the motor are both defined by generally vertical up-and-down movements. The amplitude and frequency of the shaking movements can be adjusted using a controller connected to the motor (e.g., the system controller 25), to thereby tailor the shaking force and movements applied to successfully break up any clumps of food product 14 that may be formed based on the type of food product 14 in the basket 16. As described further below, the basket support platform 46 surrounds a bottom portion of the basket 16 in such a manner to reliably retain the basket 16 and prevent unwanted touches with other baskets regardless of the movement speed or amplitude and frequency applied by the motor.

Figure 6:
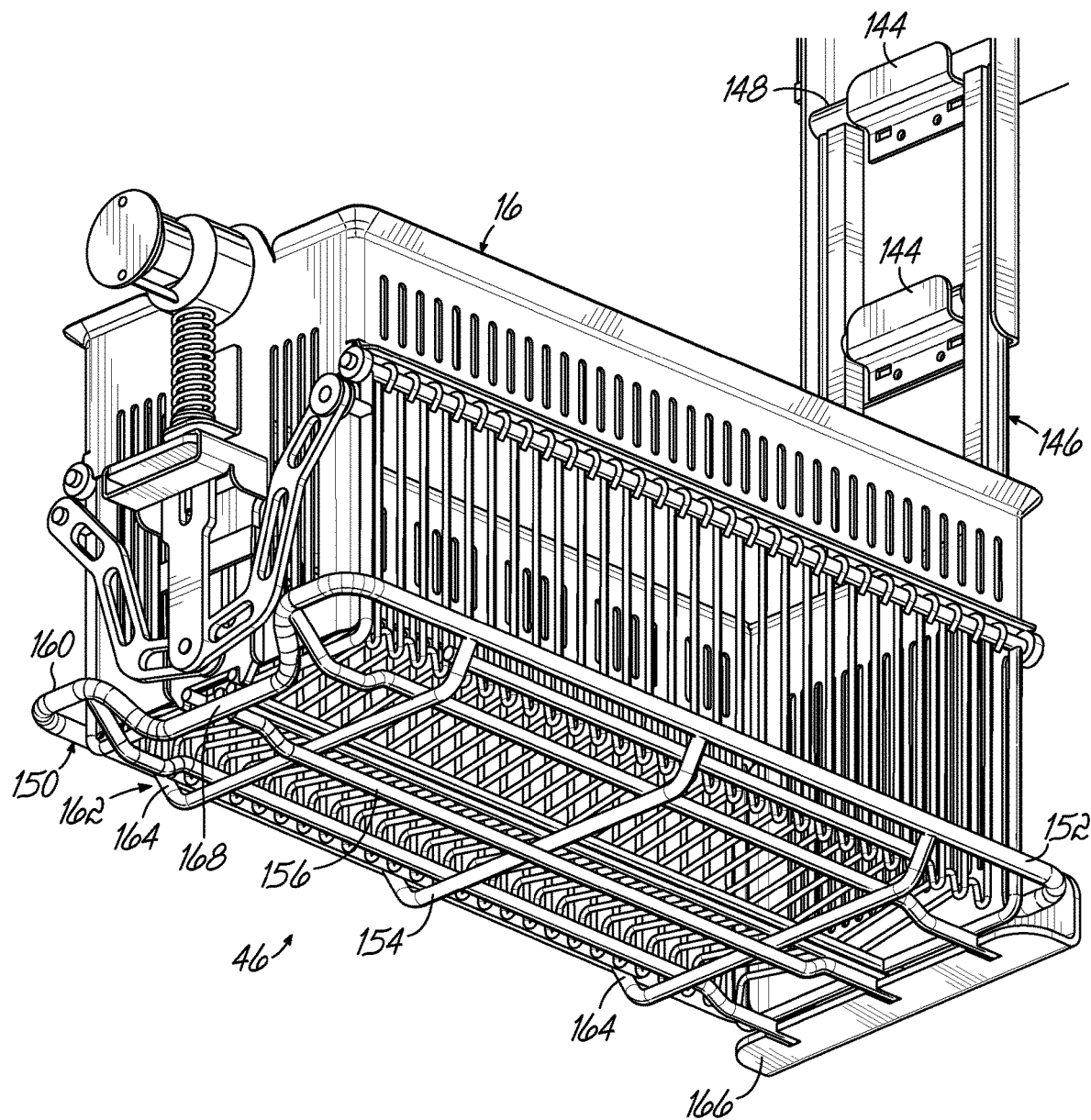
FIG. 6 is an enlarged, bottom perspective detail view of the vertical transport assembly and the fryer basket of FIGS. 5C and 5D.

Referring now to FIG. 6, the Figure shows a tray-shaped platform portion 150 shaped and configured to receive a basket 16 thereupon. The platform portion 150 is defined by a wire rack construction including a peripheral wire 152 and a plurality of lateral cross wires 154 and longitudinal cross wires 156. The peripheral wire 152 which defines an outer periphery of the platform portion 150 and an open top for the basket support platform 46. The plurality of lateral cross wires 154 and longitudinal cross wires 156 extend across a width and length, respectively, of the platform portion 150 and are surrounded by the peripheral wire 152.

Collectively, the peripheral wire 152 and plurality of lateral cross wires 154 and longitudinal cross wires 156 define a support surface 158 for receiving the basket 16. The lateral cross wires 154 extend above at least one of the longitudinal cross wires 156 and extends below at least one of the longitudinal cross wires 156 such that the lateral cross wires 154 and longitudinal cross wires 156 collectively define an interwoven construction at the support surface 158. It is to be understood that alternative weaving patterns could be employed without diverging from the scope of the disclosure. Further, the platform portion 150 of the basket support platform 46 includes a top peripheral edge 160. The support surface 158 is located in (vertical) elevation below the top peripheral edge 160. The top peripheral edges 160 define an open top for the basket support platform 46 that is larger in size than the support surface 158 such that the basket support platform 46 includes an angled entry taper 162, described in greater detail below, that narrows from the open top to the support surface 158. As shown in FIGS. 5A and 6, the peripheral wire 152 may connect to and/or be replaced by an L-shaped bracket 166 at a rear end of the platform portion 150, the L-shaped bracket 166 defining the connection of the elements of the platform portion 150 to the support arm 146. Likewise, the peripheral wire 152 at an opposite front end of the platform portion 150 may include a downwardly recessed portion 168 that is configured to provide clearance for basket-opening actuation or gripping point elements on the fryer basket 16, such elements being shown best at FIG. 6.

Figure 7B:
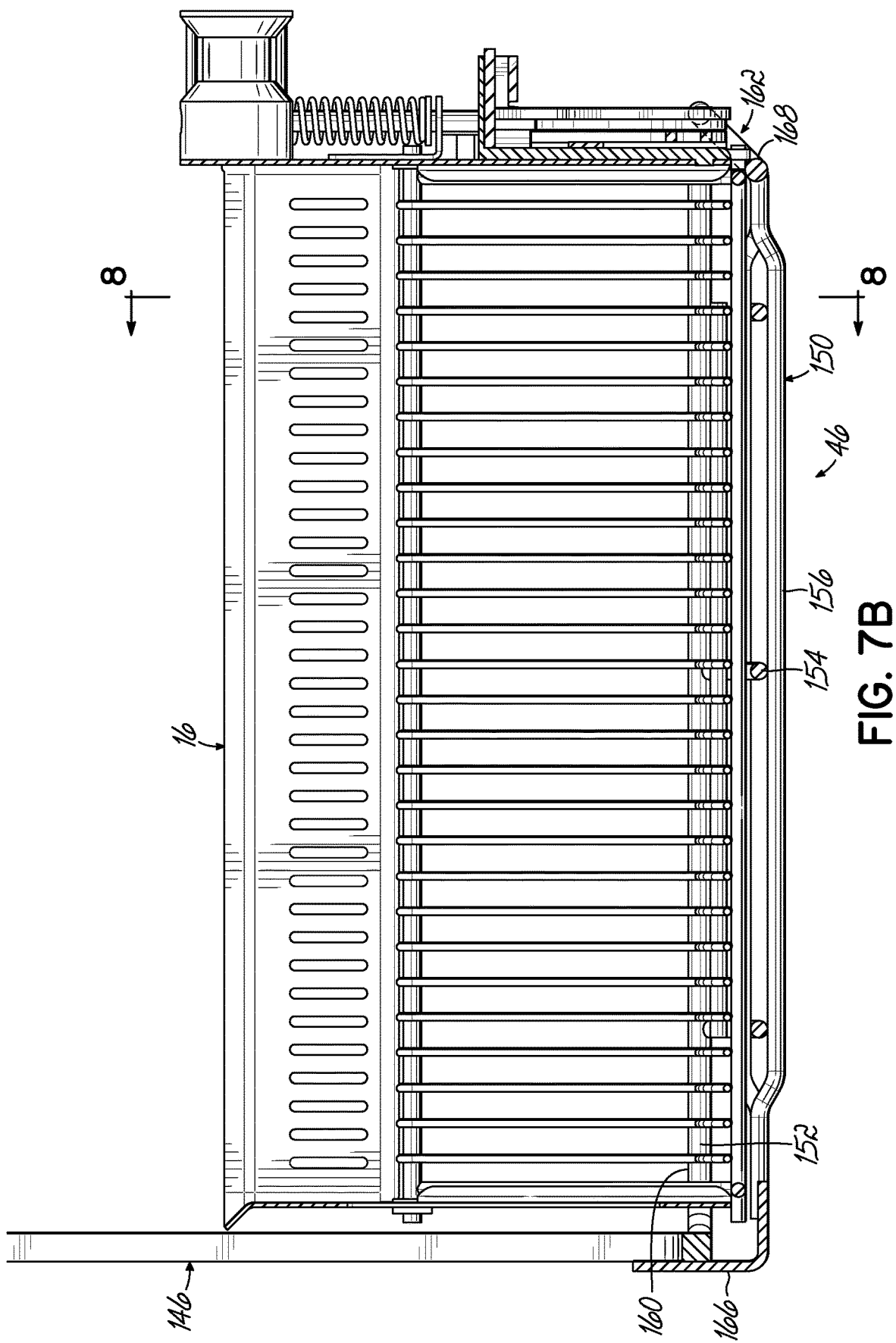
FIG. 7B is an enlarged, side cross-sectional view of the vertical transport assembly and the fryer basket of FIG. 7A.
Figure 8:
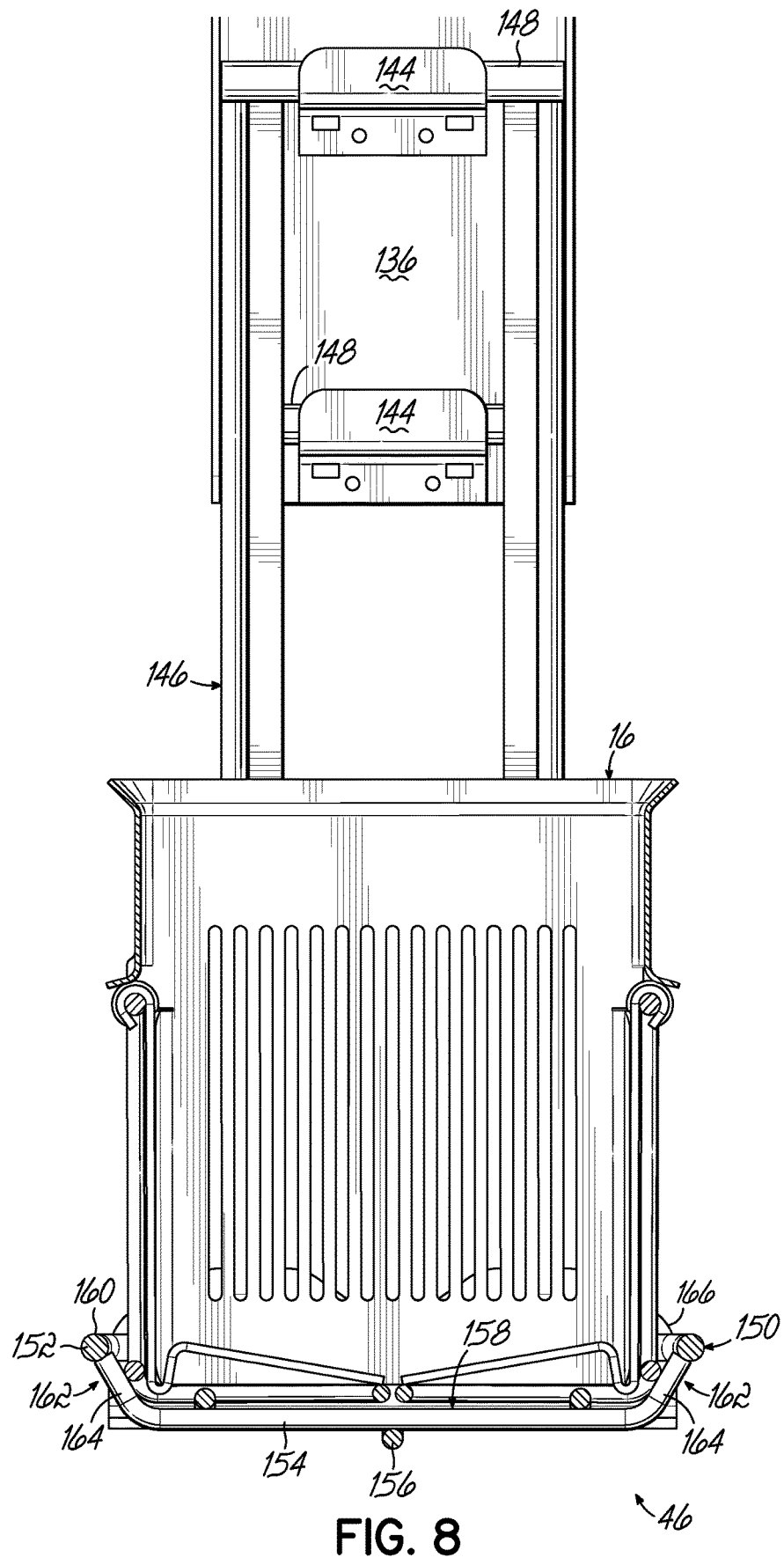
FIG. 8 is a cross-sectional view of the vertical transport assembly and the fryer basket of FIG. 7B, taken along line 8-8 in FIG. 7B.

Referring now to FIGS. 7A, 7B, and 8, the Figures show further details of the tray-shaped platform portion 150. As shown in FIG. 7A, the lateral cross wires 154 and longitudinal cross wires 156 extend in a generally horizontal direction along a length of the platform portion 150. FIG. 7B shows angled or bent portions 164 located adjacent connection points of the lateral cross wires 154 and longitudinal cross wires 156 to the peripheral wire 152 (and/or to the L-shaped bracket 166, when present). Some of the bent portions 164 extend upwardly form an elevation of the support surface 158 and some of the bent portions 164 extend downwardly from the elevation of the support surface 158, depending on where the opposite end of the bent portions 164 must connect to the peripheral wire 152 (including its downwardly recessed portion 168) and/or to the L-shaped bracket 166. Collectively, the angled or bent portions 164 define an angled entry taper 162 that narrows from the open top to the support surface 158. The angled entry taper 162 is shaped and configured to guide the basket 16 when the basket 16 is inserted into the open top of the platform portion 150 (arrow A3 in FIG. 7A) to correct any potential misalignments between the basket support platform 46 and the basket 16 as a bottom wall of the basket 16 moves into engagement with the support surface 158. As FIG. 8 shows, when the bottom wall of the basket 16 is engaged with the support surface 158 the peripheral wire 152 is located directly adjacent to the side walls of the basket 16 to thereby circumferentially surround a bottom portion of the basket 16.

Figure 9A:
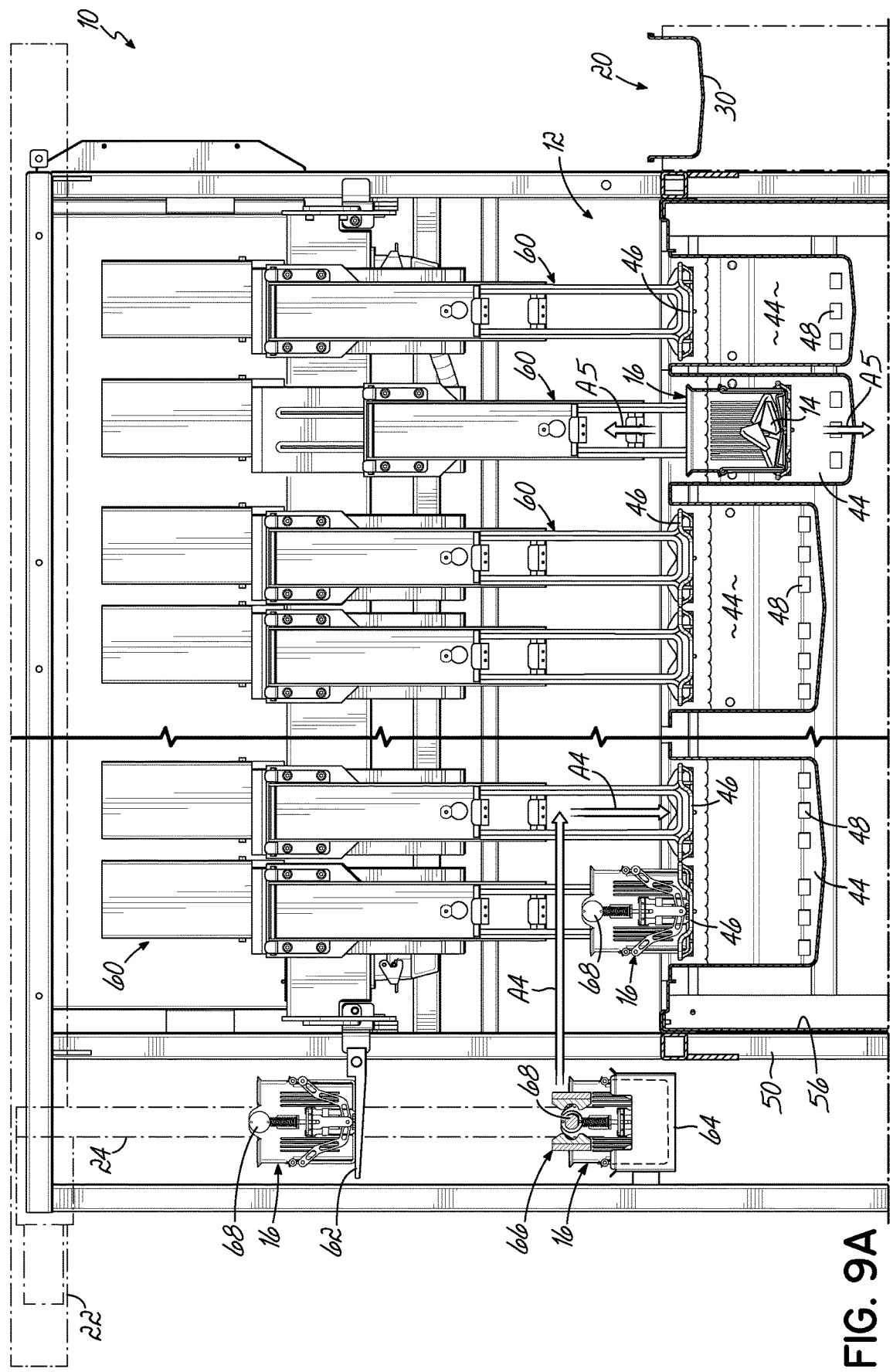
FIG. 9A is a front (partially cross-sectioned) view of a fryer similar to the one shown in FIG. 2, and more particularly showing a plurality of baskets on platforms at various stages of a cooking cycle, an exemplary process of which is shown in this following series of Figures.
Figure 9B:
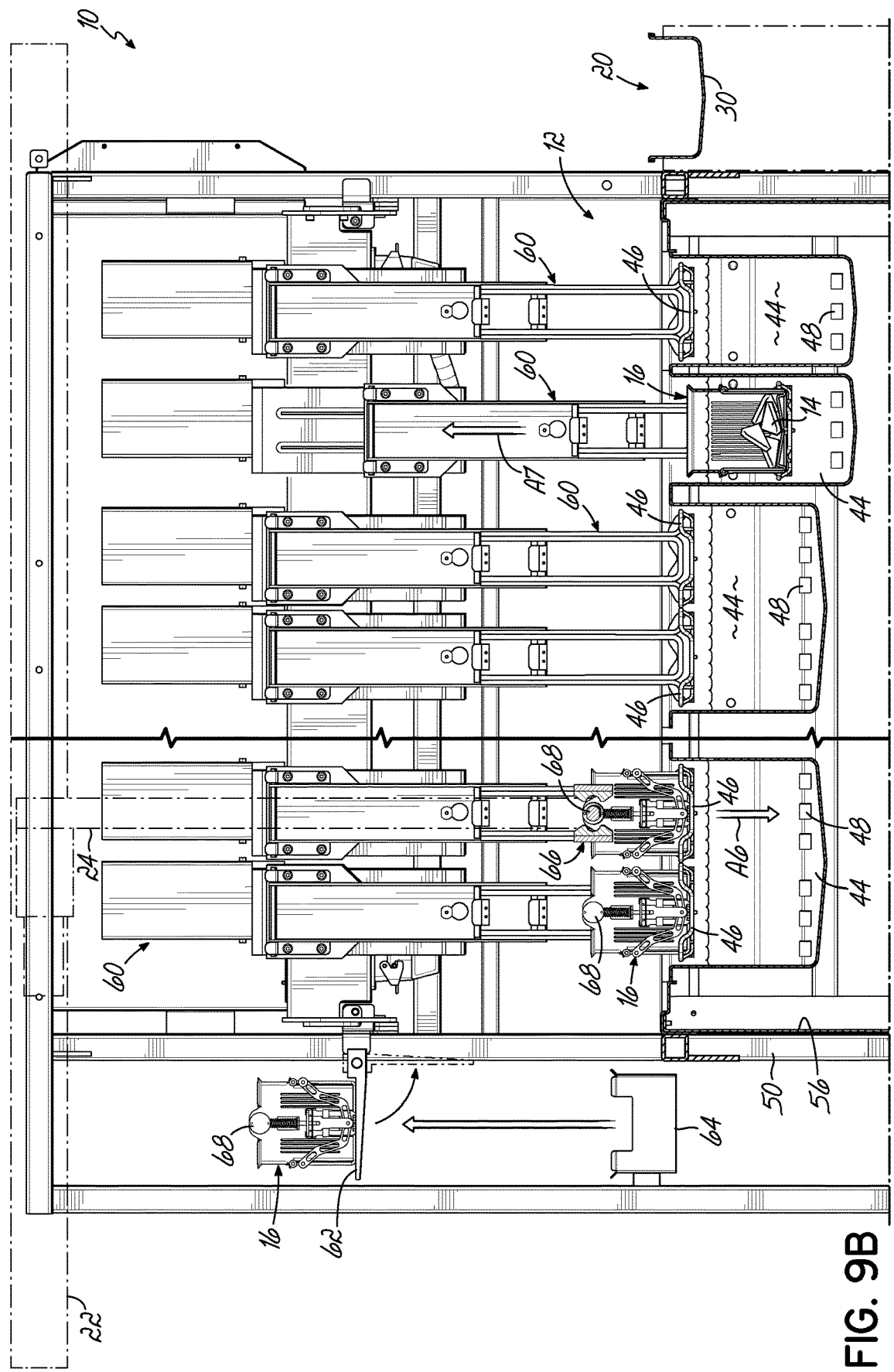
FIG. 9B is a front view similar to FIG. 9A, showing a further step of the exemplary process using the automated cooking system.
Figure 9C:
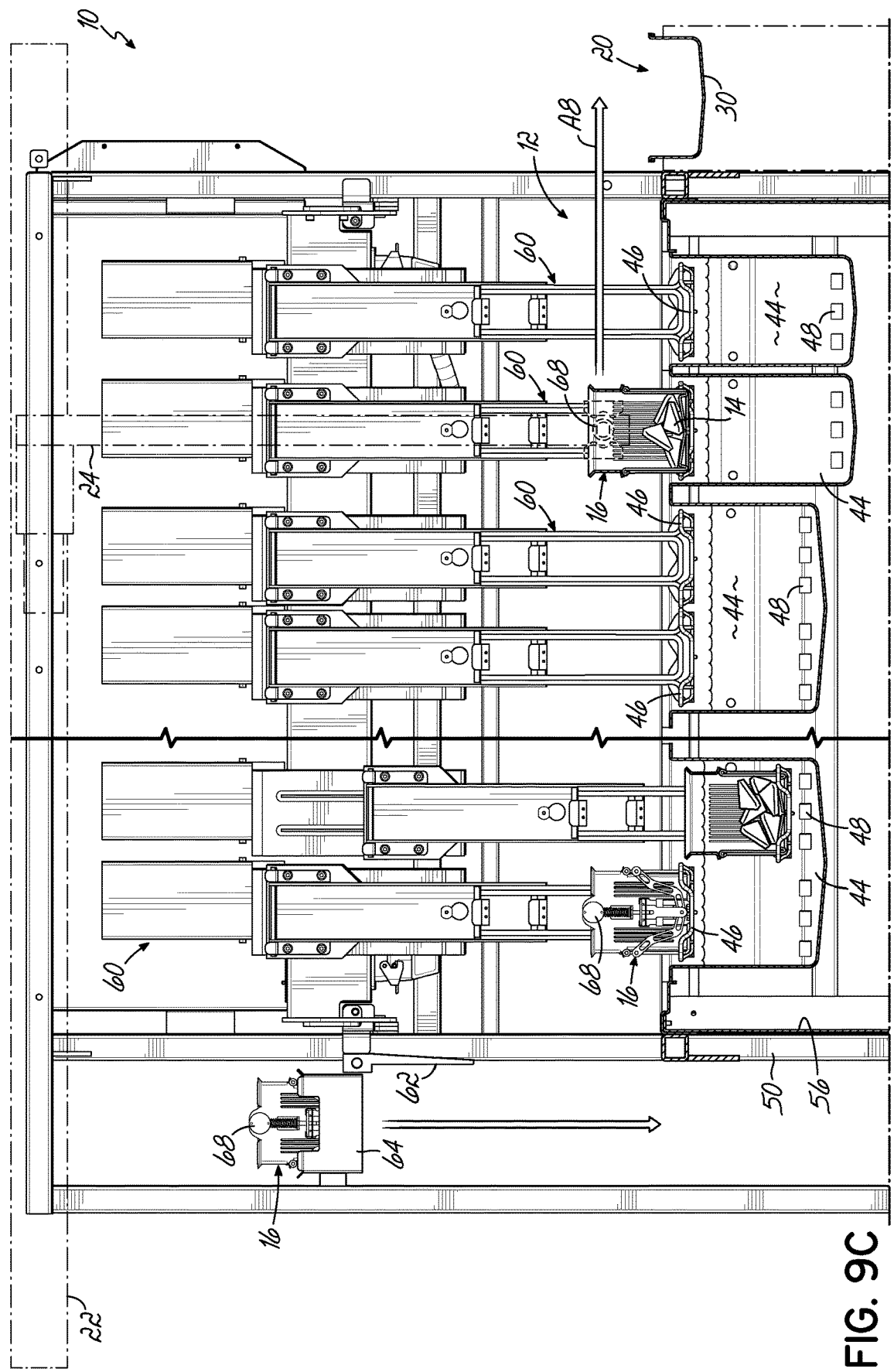
FIG. 9C is a front view similar to FIG. 9B, showing another step of the exemplary process using the automated cooking system.

Referring now to FIGS. 9A-9C, these Figures show a series of steps defining a portion of basket loading cycle and a portion of a basket discharge cycle according to embodiments of this invention, each of which may be repeatedly performed to manage basket workflow at the cooking system 10. The movements of the baskets 16 with the vertical transport assemblies 60 are also shown as a part of this operation of the cooking system 10.

Referring to FIG. 9A, the Figure shows a basket 16, filled with uncooked food product 14, to the left of the fryer 12 and located in a pickup position adjacent the dispensing freezer 18 (not shown). The basket 16 has previously been filled with uncooked food product 14 by the dispensing freezer 18 (not shown) at a filling location. If necessary, the basket movement receptacle 64 has moved the basket 16 from a filling location to the pickup location shown in the Figure such that the basket 16 is ready to be engaged by the gantry 24. After receiving a signal from the gantry control 26, the gantry 24 engages with the filled basket 16 and moves the basket 16 from the basket movement receptacle 64 to an open platform 46 above a fryer vat 42, as shown by the rightward and downward movement arrows A4 in FIG. 9A. Which platform 46 the basket 16 is moved to is typically determined by the system controller 25. Once the gantry 24 has placed a basket 16 on an open platform 46, the gantry 24 disengages with the basket 16 and leaves the basket 16 on the platform 46 above the fryer vat 42. In this position, the bottom portion of the basket 16 is circumferentially surrounded by the tray-shaped platform portion 150 at the platform 46 of the vertical transport assembly 60 to reliably retain the basket 16 for future movement steps as set forth in the workflow below.

Further, the Figure shows a basket 16, filled with partially cooked food product 14, submerged in a cooking medium 44 in a fryer vat 42 near a right side of the fryer 12. At a certain time within the cooking cycle, or alternatively at a series of set times within the cooking cycle, a basket shaking routine may be implemented (e.g., by the system controller 25 or the gantry control 26). To this end, the motor within the lift base 134 actuates with rapid changes in direction repeatedly to quickly translate the basket support platform 46 and basket 16 through small upward and downward movements as indicated by shaking movement arrows A5. Such is similar to manual shaking of the basket 16 by an operator. The shaking or small upward and downward movements of the basket 16 jostles the food products 14 within the basket 16 to break up any product marriages that may occur during the cooking process in the cooking medium 44. However, the food products 14 remain submerged within the cooking medium 44 during this shaking movement so that the cooking process continues.

Still referring to FIG. 9A, the frequency and the amplitude of the shaking movement can be adjusted based on the preferences of the end user (such as, for example, adjusted based on the type of food product 14 or the type of fryer vat 42). In one example, the small upward and downward movements may extend through about 0.2 inches of total movement and may cycle up-and-down once per second. The shaking movement may apply approximately 5 g's of force when accelerating the basket 16 in the upward and downward movements. It will be understood that the total length of shaking movement travel (e.g., the amplitude) and the frequency of the shaking movements can increase or decrease without departing from the scope of this disclosure. The amplitude and frequency of shaking movements simply needs to be set so that the movements are sufficient to reliably break up product marriages of food products 14 in the basket 16, but without causing splashing of cooking medium 44 from the fryer 12 or the like. Moreover, the time periods between initial insertion of the basket 16 into the cooking medium 44 and the shaking movement, and/or the time period between shaking movements when multiple shaking movements are performed during a cooking cycle, can be adjusted at the electronic control of the motor (e.g., by the system controller 25).

Although typically unnecessary because drip time for remaining cooking medium 44 on the food products 14 and the basket 16 is minimal, in some embodiments the shaking movement (or a smaller version thereof) can be performed by actuating the motor to quickly drive the basket 16 through small up-and-down movements while the vertical transport assembly 60 is located at an upper position. Such a shaking movement in the upper position (FIG. 5C) could help assure that all excess cooking medium 44 has dripped off before the basket 16 is moved to dump the cooked food products 14 to the next station or step.

Referring now to FIG. 9B, the Figure shows a basket 16 on the left side of the fryer 12 filled with uncooked food product 14 and located on a platform 46 above a fryer vat 42. As indicated by arrow A6, the basket 16 will be lowered into a cooking medium 44 for a cooking cycle via the vertical transport assembly 60. Further, FIG. 9B shows a basket 16 on the right side of the fryer 12 filled with cooking food product 14 that is preparing to emerge from the cooking medium 44 in a fryer vat 42. As shown by the upward arrow A7, the vertical transport assembly 60 will lift the platform 46 on which the basket 16 sits, thus raising the basket 16 from the fryer vat 42 and out of the heated cooking medium 44 and ending a cooking cycle.

In general, the platforms 46, on which the baskets 16 sit, are attached to the vertical transport assemblies 60 which move the baskets 16 into and out of the cooking medium 44 in the fryer vats 42 upon receiving signals to initiate or end a cooking cycle from the system controller 25. These actions can automatically occur at the cooking system 10 while the gantry 24 moves to perform actions on other baskets and platforms.

Referring now to FIG. 9C, the Figure shows a basket 16 on the right side of the fryer 12 filled with cooked food product 14 (after exiting a fryer vat 42) preparing to be moved, as shown by arrow A8, from a platform 46 above the fryer vat 42 to a position above the hot holding station 20 via the gantry 24. As a result, the basket 16, filled with cooked food product 14, will be suspended in a position at a height above the hot holding station 20 by the gantry 24. Upon receiving a signal from the gantry control 26, the gantry 24 will actuate the filled basket 16 to discharge the cooked food product 14 into the hot holding receiving area 30 of the hot holding station 20. The cooked food is then held in the hot holding receiving area 30 for further preparation and packaging by an operator.

Nevertheless, the gantry 24 is configured to manage the workflow of 6 or more baskets 16 and cooking stations (platforms 46) at the fryer 12 simultaneously to provide an increased maximum cooking volume throughput of the cooking system 10. The automated cooking system 10 (specifically, the vertical transport assemblies 60 and the components thereof) therefore improves the field of cooking equipment and methodologies by limiting the need for operator intervention (and associated expense) while maximizing how much food product 14 can be cooked and prepared within the standard space used by fryers in commercial setting kitchens. As such, the reliability and throughput is significantly improved even over other automatic fryer designs.

Figure 10A:
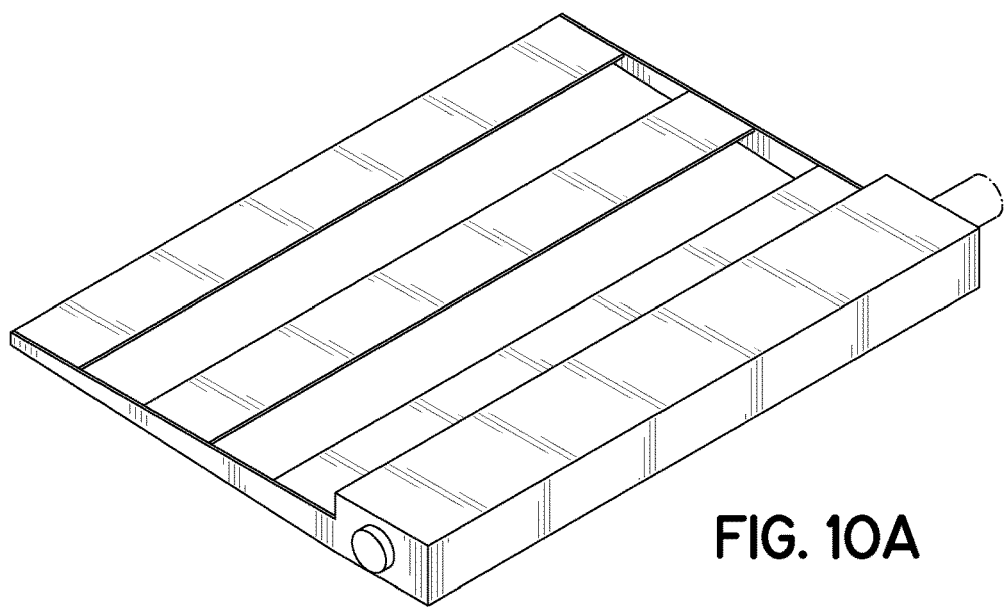
FIG. 10A is a perspective view of a staging shelf.
Figure 10B:
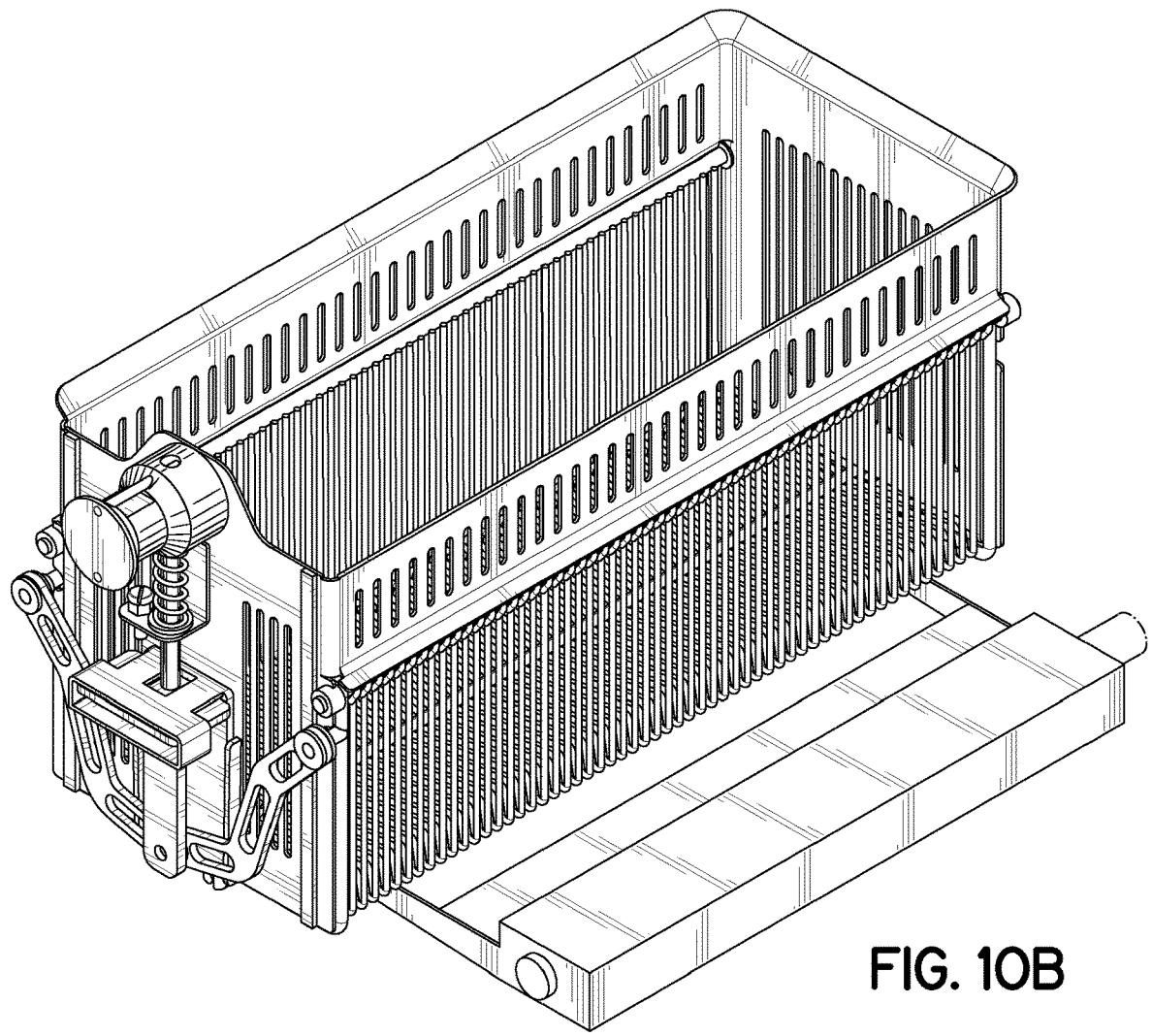
FIG. 10B is a perspective view similar to FIG. 10A, showing a basket located on top of the staging shelf of FIG. 10A.
Figure 10C:
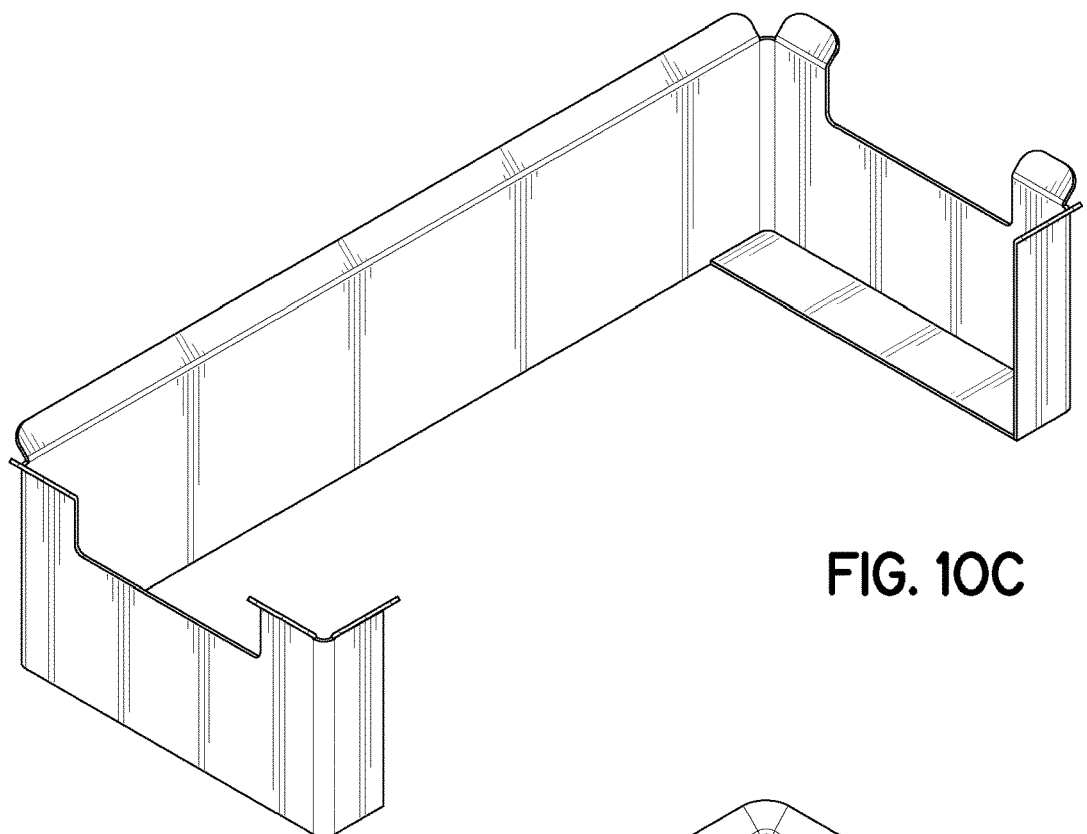
FIG. 10C is a perspective view of a basket movement receptacle.
Figure 10D:
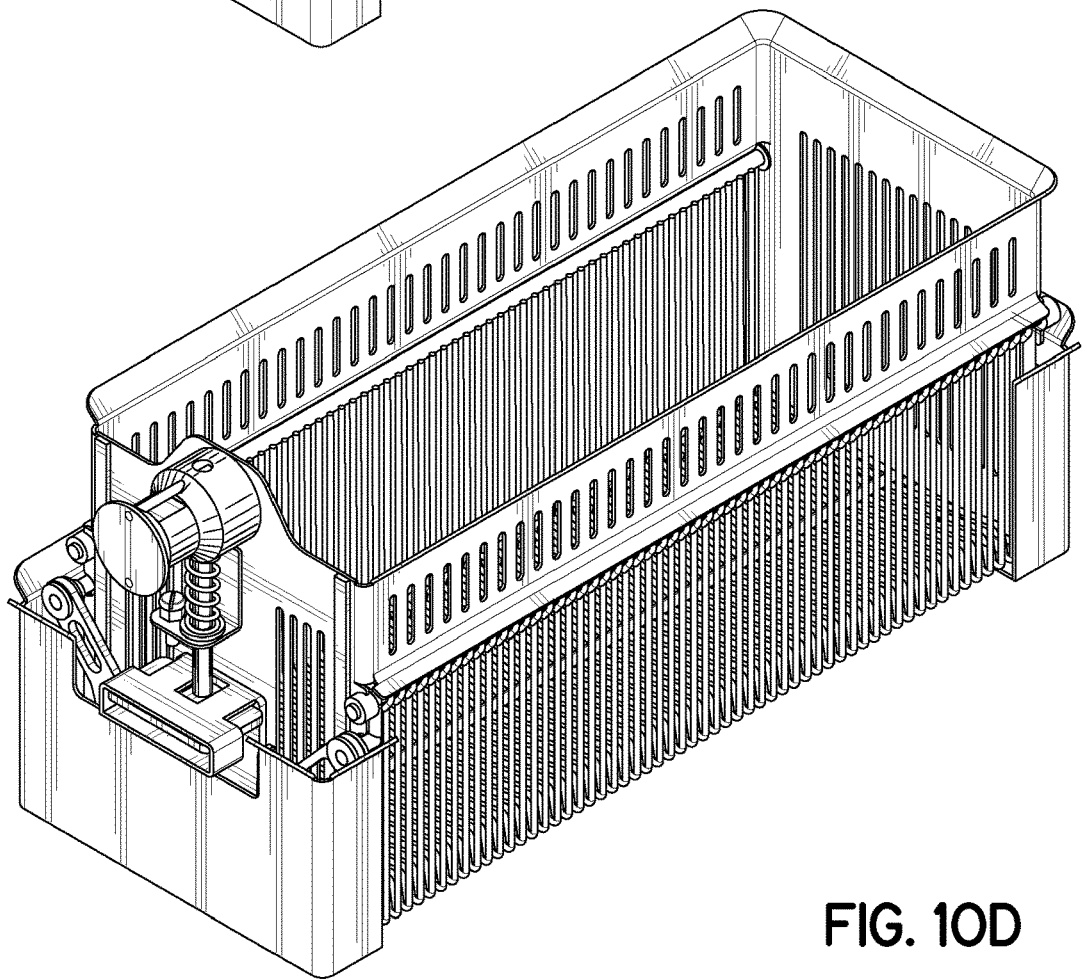
FIG. 10D is a perspective view similar to FIG. 10C, showing a basket engaged with the basket movement receptacle of FIG. 10C.
Figure 10E:
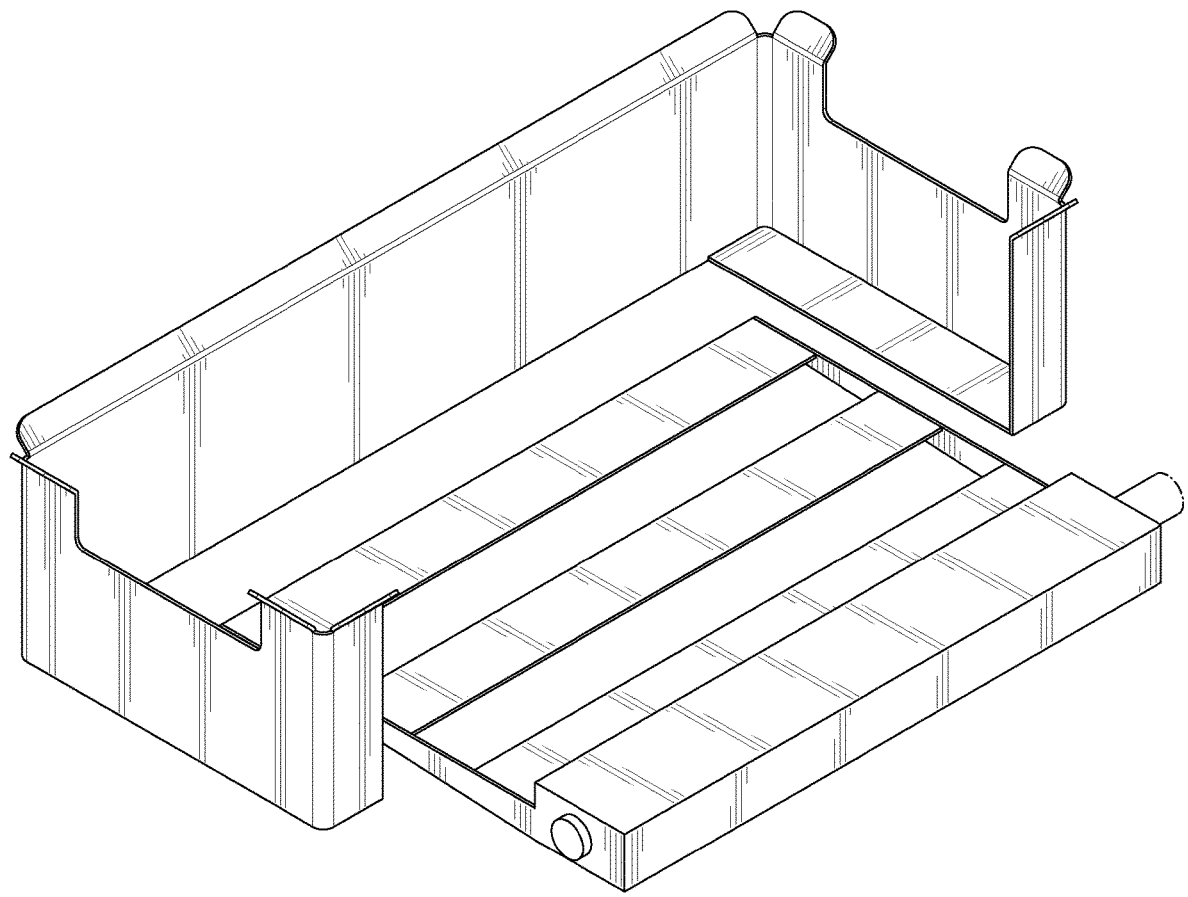
FIG. 10E is a perspective view of a basket movement receptacle and a staging shelf
Figure 10F:
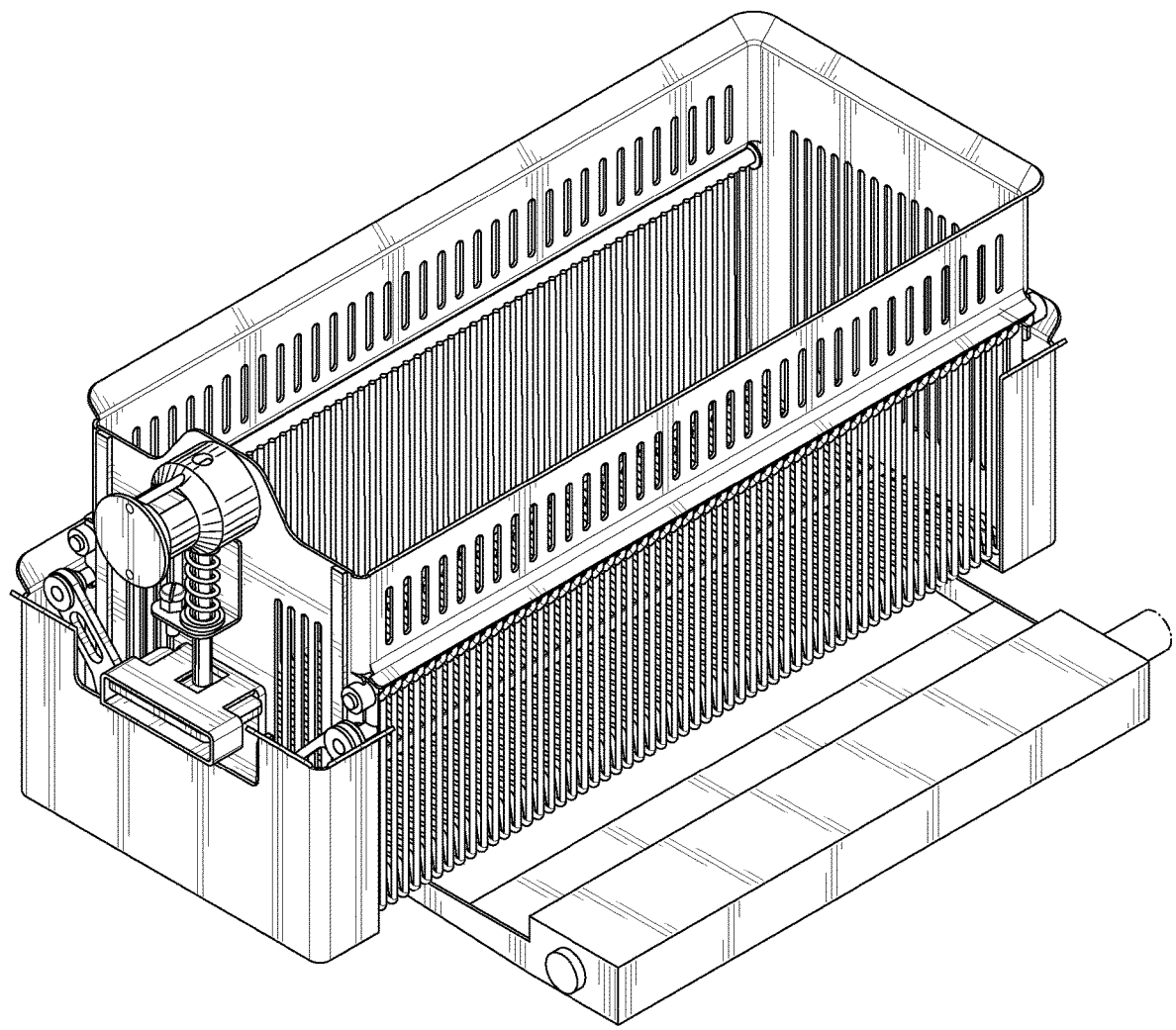
FIG. 10F is a perspective view similar to FIG. 10E, showing a basket located on top of the staging shelf and engaged with the basket movement receptacle of FIG. 10E.

Referring now to FIGS. 10A and 10B, the Figures show an embodiment of a staging shelf 62. As described above with respect to FIG. 3, the staging shelf 62 is generally located in the vicinity of the dispensing freezer 18. As shown in FIG. 10B, in a deployed position the staging shelf 62 can support a basket 16. When not supporting a basket 16, the staging shelf 62 can, alternatively, be in a stowed position. Referring now to FIGS. 10C and 10D, the Figures show an embodiment of a basket movement receptacle 64. As described above with respect to FIG. 3, the basket movement receptacle 64 is a generally U-shaped support surrounding an open slot. The basket movement receptacle 64 engages with a basket 16 (FIG. 10D) and moves the basket 16 from a filling location, where the basket 16 receives uncooked food product 14 from a dispensing freezer 18, to a pickup position, where the basket 16 can be engaged by the gantry 24 to be delivered to a platform 46 above a fryer vat 42. Referring now to FIGS. 10E and 10F, the Figures show a basket movement receptacle 64 and a staging shelf 62 arranged such that the open slot of the basket movement receptacle 64 faces generally towards the staging shelf 62. In the depicted embodiment, the basket movement receptacle 64 and the staging shelf 62 are configured such that the staging shelf 62 fits within the open slot of the basket movement receptacle 64. As FIG. 10F shows, the basket movement receptacle 64 and the staging shelf 62 work in tandem to engage a basket 16. For example, a basket 16 located at a filling location and sat atop a staging shelf 62 may be engaged from below by a basket movement receptacle 64, such that the basket movement receptacle 64 can transport the basket 16 downward to a pickup position after the staging shelf 62 transitions from a deployed position to a stowed position.

Generally, many benefits may arise through use of the automated cooking system 10. The automated cooking system 10 allows the operator to perform other tasks while the automated cooking system 10 is working. Additionally, an automated cooking system 10 allows for improved quality control of the food product 14 (e.g., precise cooking time, more precise weight of product being cooked, optimized heat management by alternating product drops between the various cooking chambers, or synchronized mini-filtration during idle periods). Additionally, the automated cooking system 10 increases the hourly product throughput versus a manually-operated system. Further, the automated cooking system 10 provides superior up-time and predictive fault diagnostics due to continual baseline performance comparisons and configurable warning thresholds.

Additional benefits of the automated cooking system 10 include, for example, an improved operator experience, availability of manual override at any point of the process, easy cleaning (typical cooking chamber cleaning procedure where the actuator surfaces can be easily wiped down), the system 10 fits into customer's current fryer width footprint, the gantry 24 fits under the 64 inch minimum hood clearance, minimal interference with existing fire suppression systems due to the design of the system 10 and fryer 12, making retrofit and site approvals easier, moving parts and controls being shielded from operator and extreme heat, optimized motions allowing for minimal speeds to reduce risk of operator contact, and being retrofittable to existing fryers. Furthermore, although the operational improvements and efficiencies have been explained with reference to an automated cooking system 10 that uses both the gantry system 22 and the vertical transport assemblies 60, it will be understood that many of the same technical improvements are achieved when using the vertical transport assemblies 60 with fryers that do not have a fully automated gantry system 22 as well. To this end, the present invention is not so limited to the specific examples and context shown in the drawings described above.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A fryer for use with an automated cooking system, the fryer comprising:
    a plurality of fryer vats, each configured to hold a cooking medium, and each defining one or more cooking stations at the fryer;
    at least one heating element disposed within each of the fryer vats; and
    a plurality of vertical transport assemblies located proximate to and associated with each of the fryer vats such that one vertical transport assembly is associated with and mounted proximate each of the fryer vats, each vertical transport assembly configured to support and move a basket of food product into and out of the cooking medium at the respective fryer vat, and each vertical transport assembly including:
        a lift base mounted proximate to the associated fryer vat and containing a motor;
        a platform support hanger extending from the lift base and operatively coupled to the motor, such that the motor actuates to generate movement of the platform support hanger relative to the fryer vat; and
        a basket support platform removably connected to the platform support hanger, the basket support platform including a support arm extending generally vertically to connect with the platform support hanger and a tray-shaped platform portion extending generally horizontally from the support arm, the tray-shaped platform portion being configured and shaped to circumferentially surround a bottom portion of a basket set onto the basket support platform, to thereby retain the basket during movements towards and away from the cooking medium, wherein each vertical transport assembly is configured to receive the basket moved horizontally to the fryer vat by a gantry separate from the vertical transport assembly.

2. The fryer of claim 1, wherein the platform portion of the basket support platform is defined by a wire rack construction including a peripheral wire, which defines an outer periphery of the platform portion and an open top for the basket support platform, and a plurality of lateral cross wires and longitudinal cross wires that extend across a width and length surrounded by the peripheral wire, thereby collectively defining a support surface for receiving the basket.

3. The fryer of claim 2, wherein each of the lateral cross wires and longitudinal cross wires extends generally horizontally along a length thereof except adjacent connection points to the peripheral wire, with angled or bent portions located adjacent the connection points such that the platform portion collectively defines an angled entry taper that narrows from the open top to the support surface, wherein the angled entry taper guides the basket during insertion into the open top to correct any misalignments between the basket support platform and the basket as a bottom wall of the basket is moving into engagement with the support surface.

4. The fryer of claim 3, wherein the peripheral wire is located directly adjacent side walls of the basket when the bottom wall of the basket is engaged with the support surface.

5. The fryer of claim 2, wherein each of the lateral cross wires extends above at least one of the longitudinal cross wires and extends below at least one of the longitudinal cross wires such that the lateral cross wires and longitudinal cross wires collectively define an interwoven construction at the support surface.

6. The fryer of claim 1, wherein the platform portion of the basket support platform includes a top peripheral edge and a support surface located in elevation below the top peripheral edge, the top peripheral edge defining an open top for the basket support platform that is larger in size than the support surface such that the basket support platform include an angled entry taper that narrows from the open top to the support surface, and wherein the angled entry taper guides the basket during insertion into the open top to correct any misalignments between the basket support platform and the basket as a bottom wall of the basket is moving into engagement with the support surface.

7. The fryer of claim 1, wherein the platform support hanger includes a hook receptacle and the support arm of the basket support platform includes a lateral rod sized to be inserted within the hook receptacle to releasably couple the support arm to the platform support hanger.

8. The fryer of claim 7, wherein the platform support hanger includes a plurality of hook receptacles located at different elevations along a height of the platform support hanger, and wherein the support arm of the basket support platform includes a plurality of lateral rods sized and positioned to be inserted within the plurality of hook receptacles to releasably couple the support arm to the platform support hanger.

9. The fryer of claim 1, wherein the lift base includes a housing and a front panel that is moveably connected to the housing and driven to move upwardly and downwardly by the motor contained within the housing, the front panel including connection elements configured to removably engage with connection elements on the platform support hanger such that the platform support hanger extends downwardly below a bottom end of the front panel.

10. The fryer of claim 1, wherein at least one of the connections between the platform support hanger and the lift base or the basket support platform is configured to allow pivotal relative movement such that at least one of the basket support platform and the platform support hanger is being pivoted upwardly away from the fryer vat to allow the fryer vat to be accessed for cleaning or maintenance.

11. The fryer of claim 1, wherein the lift base for each vertical transport assembly is mounted on a frame behind and above a top opening of a respective fryer vat, thereby keeping a front end of baskets supported on the vertical transport assembly fully accessible for manipulation and movement by a gantry included with the automated cooking system.

12. The fryer of claim 1, wherein when a basket is loaded onto the basket support platform, the motor of the vertical transport assembly is controlled to move the basket and the basket support platform between an upper position, in which the basket is located above the cooking medium, and a lower position, in which the basket is submerged in the cooking medium.

13. The fryer of claim 12, wherein the motor of the vertical transport assembly is further controlled to rapidly move the basket and the basket support platform in a reciprocating manner to selectively shake the basket while at or near the lower position to break up product marriages of food product that are being developed during a cooking cycle at the fryer.

14. The fryer of claim 13, wherein the movements of the basket and the basket support platform between the upper position and the lower position and the shaking movements of the basket and the basket support platform generated by the motor are both defined by generally vertical up-and-down movements, and an amplitude and a frequency of shaking movements generated by the motor at the basket are adjustable.

15. The fryer of claim 1, wherein a bottom surface of the basket sits on and is supported by the tray-shaped platform portion during the movements, and wherein a top surface defined by the tray-shaped platform portion is located above a bottom surface of the basket and located below a top of the basket when the basket sits on and is supported by the tray-shaped platform portion.

16. The fryer of claim 15, wherein the support arm includes a top end and a bottom end vertically spaced from the top end, the top end of the support arm being connected with the platform support hanger, and the tray-shaped platform portion extending from the bottom end such that the tray-shaped platform portion is positioned below the lift base and below the platform support hanger.

17. A fryer for use with an automated cooking system, the fryer comprising:
  a plurality of fryer vats, each configured to hold a cooking medium, and each defining one or more cooking stations at the fryer;
  at least one heating element disposed within each of the fryer vats; and
  a vertical transport assembly located proximate to and associated with each of the fryer vats, the vertical transport assembly configured to support and move a basket of food product into and out of the cooking medium at the fryer vat, and each vertical transport assembly including:
    a lift base mounted proximate to the associated fryer vat and containing a motor;

a platform support hanger extending from the lift base and operatively coupled to the motor, such that the motor actuates to generate movement of the platform support hanger relative to the fryer vat; and a basket support platform removably connected to the platform support hanger, the basket support platform including a support arm extending generally vertically to connect with the platform support hanger and a tray-shaped platform portion extending generally horizontally from the support arm, the tray-shaped platform portion being configured and shaped to circumferentially surround a bottom portion of a basket set onto the basket support platform, to thereby retain the basket during movements towards and away from the cooking medium, wherein a bottom surface of the basket sits on and is supported by the tray-shaped platform portion during the movements, and wherein a top surface defined by the tray-shaped platform portion is located above a bottom surface of the basket and located below a top of the basket when the basket sits on and is supported by the tray-shaped platform portion.

* * * * *